US011941927B2

(12) United States Patent
Ranjan et al.

(10) Patent No.: US 11,941,927 B2
(45) Date of Patent: Mar. 26, 2024

(54) ELECTROMECHANICAL DEVICE THAT COUNTS, CALCULATES, AND REPORTS WAIT TIMES AND OCCUPANCY RATES IN REAL-TIME

(71) Applicants: Riya Ranjan, Cupertino, CA (US); Alson Chan, Palo Alto, CA (US); Katherine Wang, Los Altos, CA (US); Keshav Anand, Folsom, CA (US); Henry Trinh, East Elmhurst, NY (US)

(72) Inventors: Riya Ranjan, Cupertino, CA (US); Alson Chan, Palo Alto, CA (US); Katherine Wang, Los Altos, CA (US); Keshav Anand, Folsom, CA (US); Henry Trinh, East Elmhurst, NY (US)

(*) Notice: Subject to any disclaimer, the term of this patent is extended or adjusted under 35 U.S.C. 154(b) by 242 days.

(21) Appl. No.: 17/398,995

(22) Filed: Aug. 10, 2021

(65) Prior Publication Data
US 2022/0051494 A1 Feb. 17, 2022

Related U.S. Application Data

(60) Provisional application No. 63/063,965, filed on Aug. 11, 2020.

(51) Int. Cl.
*G07C 9/00* (2020.01)
*G05B 19/042* (2006.01)

(52) U.S. Cl.
CPC ............. *G07C 9/00* (2013.01); *G05B 19/042* (2013.01); *G05B 2219/25257* (2013.01)

(58) Field of Classification Search
CPC ................... G07C 9/00; G05B 19/042; G05B 2219/25257
See application file for complete search history.

(56) References Cited

U.S. PATENT DOCUMENTS

| 6,759,954 | B1 | 7/2004 | Myron et al. |
| 9,671,526 | B2 | 6/2017 | Kumar |
| 9,965,938 | B1* | 5/2018 | Cronin .................... H04W 4/02 |
| 10,282,763 | B1 | 5/2019 | Sulejmani |
| 11,151,858 | B2* | 10/2021 | Modiano ................ G08B 21/22 |
| 2015/0276977 | A1 | 10/2015 | Varacalli |
| 2019/0139104 | A1* | 5/2019 | Hanley ..................... G07C 9/20 |
| 2019/0295386 | A1* | 9/2019 | Roberts .................. G08B 7/062 |
| 2019/0392377 | A1* | 12/2019 | Munir .................. G06Q 10/087 |
| 2020/0082551 | A1 | 3/2020 | Steiner |
| 2020/0245423 | A1* | 7/2020 | Honjo ................. F21V 23/0471 |

OTHER PUBLICATIONS

LineLess: Learn More http://www.lineless.wixsite.com/lineless/how-it-works [1-2] (2021).
SenSource website http://www.sensourceinc.com [1-13] (2021).

* cited by examiner

*Primary Examiner* — Laura A Gudorf
(74) *Attorney, Agent, or Firm* — WILSON SONSINI GOODRICH & ROSATI

(57) ABSTRACT

Provided are systems, devices, and methods to calculate and display information pertaining to a space. Information pertaining to the space may include a number of one or more objects that are permitted to enter the space and a wait time to enter the space.

30 Claims, 13 Drawing Sheets

ELECTROMECHANICAL DEVICE THAT COUNTS, CALCULATES, AND REPORTS WAIT TIMES AND OCCUPANCY RATES IN REAL-TIME

CROSS-REFERENCE

This application claims the benefit of U.S. Provisional Application No. 63/063,965, filed Aug. 11, 2020, which application is incorporated herein by reference.

BACKGROUND

Adhering to occupancy limits helps to maintain the safety of a space, such as a restaurant or store. Such occupancy limits help to maintain a safe environment if an emergency arises, such as a fire, and can play a crucial role in curbing the transmission of diseases by ensuring that spaces are not overcrowded. The important role of occupancy limits has been noticeable during the COVID-19 pandemic. While adhering to occupancy limits is important, accurately tracking such occupancy limits has remained a difficult task where errors often occur. Often, tracking the number of occupants allowed in a space until an occupancy limit is reach is subject to multiple opportunities for error. Therefore, there is a need for accurate tracking of occupancy limits and automated tracking of capacity.

Additionally, people spend numerous hours waiting in queues they did not anticipate. If a person was able to view an estimated waiting time for entry into a space people would save time by not waiting in queues they did not anticipate. Therefore, there is a need for tracking and reporting wait times for entry into a space.

SUMMARY

Provided herein, in some embodiments, are devices engineered to calculate occupancy rates and regulate maximum capacity, as well as estimate wait times for a given enclosed space, such as a public area. In some embodiments, data regarding such occupancy rates and wait times are distributed from the device to a server (e.g., a cloud server) in wireless communication with electronic devices (e.g., personal electronic devices belonging to a user), where it can be displayed in real-time via a user interface of the electronic device. Also provided here are systems comprising the devices disclosed here, and methods of their use to calculate estimated wait times to enter a space as well as occupancy limits for the space.

Provided herein, in some embodiments, are systems for displaying a value, comprising: a server; one or more electronic devices in wireless communication with said server; and a housing comprising: one or more sensors comprising an ultrasonic sensor configured to generate location data corresponding with one or more objects entering a space or exiting the space; one or more microcontrollers in wireless communication with said server, wherein said one or more microcontrollers is individually or collectively programed to implement a method comprising: (i) receiving said location data corresponding with said one or more objects entering said space or exiting said space; (ii) calculating a value based on said location data received in (i); and (iii) transmitting said value to said server, wherein said server is configured to transmit said value to one or more electronic devices; and a display operably coupled to said one or more microcontrollers and disposed on a surface of said housing, wherein said display is configured to display said value. In some embodiments, the one or more electronic devices comprises a personal electronic device comprising an application for requesting said value for said space. In some embodiments, calculating the value in (ii) comprises: (a) calculating an average time for a first object of said one or more objects to enter said space and a second object of said one or more objects to exit said space; and (b) multiplying the average time by a number of electronic devices of said one or more electronic devices that are in wireless communication with said one or more microcontrollers, wherein said value comprises an estimated wait time to enter said space. In some embodiments, the wireless communication between the one or more electronic devices and said one or more microcontrollers is a wireless communication comprising a maximum connectivity range of about 50 meters. In some embodiments, the calculating of the value in (ii) comprises: (a) counting a number of said one or more objects in the space based on the location data received in (i); and (b) subtracting said number of said one or more objects counted in (a) from a predetermined threshold value, wherein said predetermined threshold value is a maximum occupancy for the space, wherein said value comprises a maximum number of said one or more objects permitted to enter the space. In some embodiments, the system further comprises an output interface configured to receive input from a user comprising the value, a predetermined threshold value, or a combination thereof, and wherein said output interface is in communication with said one or more microcontrollers. In some embodiments, the housing is positioned above a portal of the space such that said one or more sensors are positioned to detect said one or more objects entering said space or exiting said space through said portal.

The present disclosure also provides, in some embodiments, a computer-implemented method for displaying a value, said computer-implemented method comprising: (a) providing a housing comprising (i) one or more sensors comprising an ultrasonic sensor, (ii) one or more microcontrollers, and (iii) a display disposed on a surface of said housing; (b) receiving, by said one or more sensors, an ultrasonic signal corresponding with one or more objects entering a space or exiting said space to produce location data for said one or more objects; (c) receiving, by said one or more microcontrollers, said location data from said one or more sensors; (d) calculating, by said one or more microcontrollers, said value, based, on least in part, on said location data received from said one or more sensors in (c); (e) displaying said value on said display; and (f) transmitting, by said one or more microcontrollers, said value to a server that transmits said value to one or more electronic devices in wireless communication with said server. In some embodiments, the one or more electronic devices comprise a personal electronic device comprising an application for requesting said value for said space. In some embodiments, the value comprises an estimated wait time to enter said space, and wherein said calculating said value in (d) comprises: (i) calculating an average time for a first object of said one or more objects to enter said space and a second object of said one or more objects to exit said space; and (ii) multiplying said average time calculated in (i) by a number of said one or more electronic devices in wireless communication with said one or more microcontrollers. In some embodiments, the wireless communication between the number of said one or more electronic devices and said one or more microcontrollers is a wireless communication comprising a maximum connectivity range of about 50 meters. In some embodiments, the value comprises a number of said one or more objects permitted to enter the space, and wherein said calculating said value in (d) comprises: (i) counting a number of said one or more objects in the space based on the location data received in (c); and (ii) subtracting the number calculated in (i) from a predetermined threshold value, wherein said predetermined threshold value is a maximum occupancy for the space. In some embodiments, the calculating of said value in (d) comprises calculating two values comprising a first value and second value, and wherein calculating a first value of said two values comprises: (i) calculating an average time for a first object of said one or more objects to enter said space and a second object of said one or more objects to exit said space; and (ii) multiplying said average time calculated in (i) by a number of said one or more electronic devices in wireless communication with said one or more microcontrollers; and wherein the first value comprises an estimated wait time to enter said space. In some embodiments, the calculating of a second value of said two values comprises: (i) counting a number of said one or more objects in the space based on the location data received in (c); and (ii) subtracting the number calculated in (i) from a predetermined threshold value, wherein said predetermined threshold value is a maximum occupancy for the space; and wherein the second value comprises a number of objects permitted to enter said space The present disclosure also provides, in some embodiments, a method for displaying a value, said method comprising: (a) providing a housing comprising: (i) one or more sensors comprising an ultrasonic sensor for detecting an ultrasonic signal corresponding with one or more objects entering a space or exiting said space, thereby producing location data for said one or more objects; (ii) one or more microcontrollers that (1) receives said location data from said ultrasonic sensor, and (2) calculates said value, based, at least in part, on said location data received in (1) from said ultrasonic sensor; and (iii) a display disposed on a surface of said housing that displays said value; and (b) transmitting, by said one or more microcontrollers, said value to a server, wherein said server transmits said value to one or more electronic devices in wireless communication with said server. In some embodiments, the value is calculated in (2) by a method comprising: calculating an average time for a first object of said one or more objects to enter said space and a second object of said one or more objects to exit said space; and multiplying said average time calculated in (a) by a number of said one or more electronic devices that is in wireless communication with said one or more microcontrollers, wherein said value comprises an estimated wait time to enter said space. In some embodiments, the wireless communication between the number of said one or more electronic devices and said one or more microcontrollers is a wireless communication comprising a maximum connectivity range of about 50 meters. In some embodiments, the value is calculated in (2) by a method comprising: counting a number of said one or more objects in the space based on the location data received in (ii)(1); and subtracting the number of said one or more objects in the space from a predetermined threshold value, wherein said predetermined threshold value is a maximum occupancy for the space, and wherein said value comprises a number of said one or more objects permitted to enter the space. In some embodiments, the method further comprises transmitting an input to said one or more microcontrollers by an output interface configured for receiving said input from a user, wherein said input comprises said value, a predetermined threshold value, or a combination thereof. In some embodiments, the one or more electronic devices comprise a personal electronic device comprising an application for requesting said value for said space.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
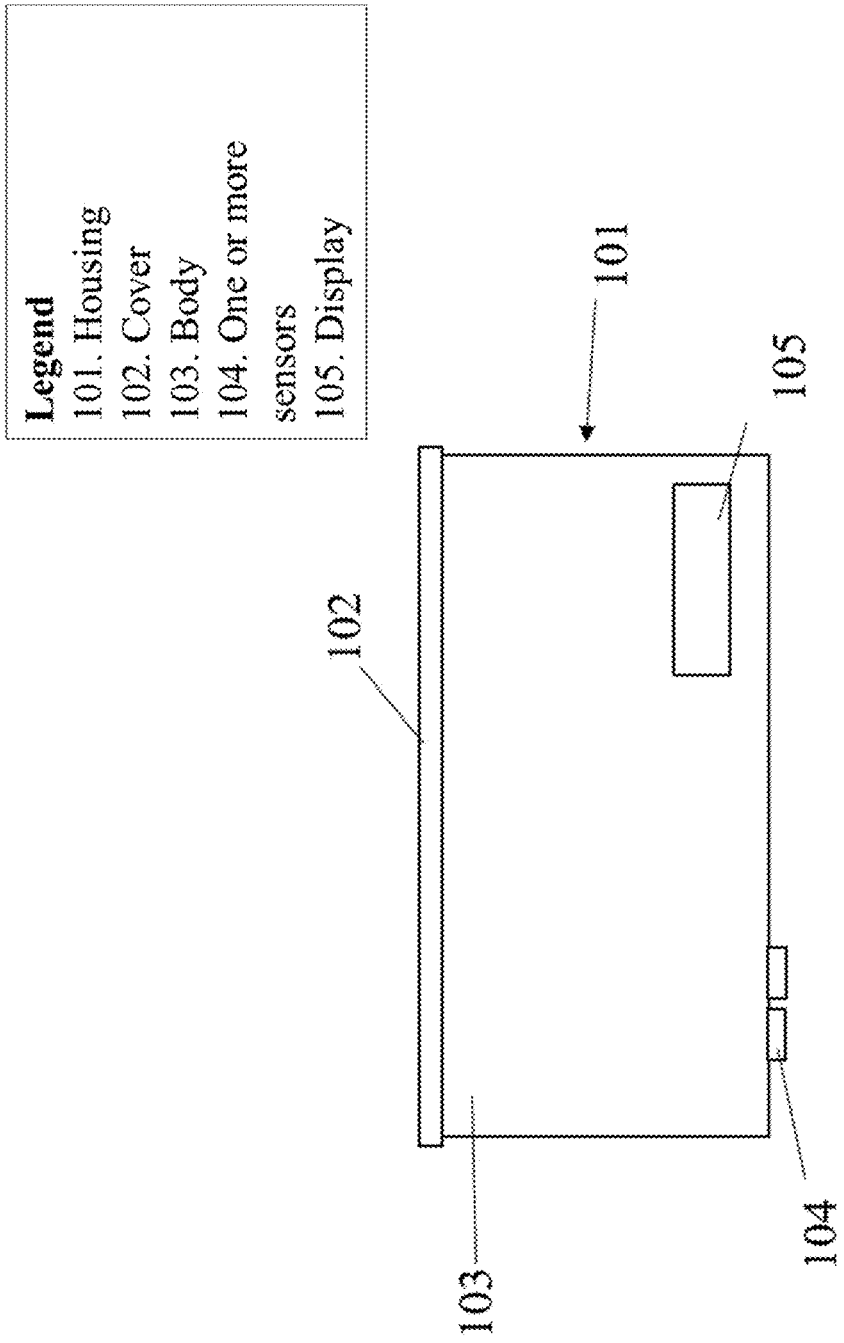
FIG. 1A shows a side view of one embodiment of the housing ("hardware housing") according to an embodiment disclosed herein.

Provided herein, in some embodiments, are methods, devices, and systems used to report a wait time, and a number of objects permitted to enter a space. The number of objects permitted to enter the space may be calculated based off of a predetermined threshold value. The predetermined threshold value may be a occupancy limit of a space, such as a store, restaurant, or bar. The occupancy limit may be a maximum occupancy limit. In some embodiment, the object of the present disclosure is a subject, such as an animal or human. In some embodiments, the object is an inanimate object, such as a car keys, a cell phone, a automotive vehicle, and the like.

Occupancy limits may play an important part in keeping patrons and employees of the space safe. Emergencies, such as fires, or structural damage may result in catastrophic losses if maximum occupancy limits are not followed. When a space exceeds a maximum occupancy an orderly exit of the space may become exceedingly more difficult.

Additionally, exceeding occupancy limits may result in an increased transmission of diseases due to the crowding and close proximity of patrons. Notably, adherence to maximum occupancy limits may have played, and may continue to play, an important role in helping to curb the transmission of Coronavirus disease 2019 (COVID-19). During the COVID-19 pandemic occupancy limits were cut, such as by 75%, 50%, or 25%. Transmission of COVID-19 was not as prevalent because there was less crowding, and thus less interaction between the patrons. However, in many cases such maximum occupancy limits were either not followed by the employees or owners of a space, or the difficulty in keeping track of the number of occupants in a space was too difficult to accurately keep track. Often, a large space will have a few employees that may be tasked with not only maintaining their normal duties but also tasked with ensuring that maximum occupancy limits are not exceeded. Keeping track of the occupancy limits is often difficult, if not near impossible in many cases. The novel methods, devices, and systems provided herein help adherence to maximum occupancy limits.

Furthermore, there are often wait times associated with entering a space. Many hours of a person's life may be spent by simply waiting in a queue. Often a wait time was not expected by someone who has entered a queue, or they are unaware of an estimation of the amount of time they will be waiting in the queue.

In some embodiments, the systems and methods described herein comprise an integrated hardware system and a software system that is capable of delivering a number of objects permitted to enter a space (real-time occupancy counting) and a wait time.

The present disclosure provides, in accordance with some embodiments herein, devices, methods, and systems for monitoring and reporting to a user pertinent information related to the capacity of a space or estimated wait time for entering a space, such as one or more values. Specifically, the present disclosure provides a sensor, microcontroller, and display that detects, monitors, and reports to the user the pertinent information, such as a wait-time, a number of objects that may enter a space before a threshold value is reached, a number of objects in a queue for entering the space, and a maximum threshold.

I. SYSTEMS

Provided herein, in some embodiments, are systems comprising devices for monitoring and/or reporting any of the values disclosed herein. The values may represent, but are not limited to representing, a wait time, and/or a number of objects that may enter a space before a threshold value is reached. In some embodiments, the system comprises a device disclosed herein. In some embodiments the system comprises a server. In some embodiments, the system comprises one or more electronic devices. In some embodiments, the system comprises an output interface. In some embodiments, the system comprises a device, a server, and one or more electronic devices. In some embodiments, the system comprises a device, a server, one or more electronic devices, and an output interface. In some embodiments, the system comprises hardware, such as an integrated hardware system, and a software system.

Figure 2:
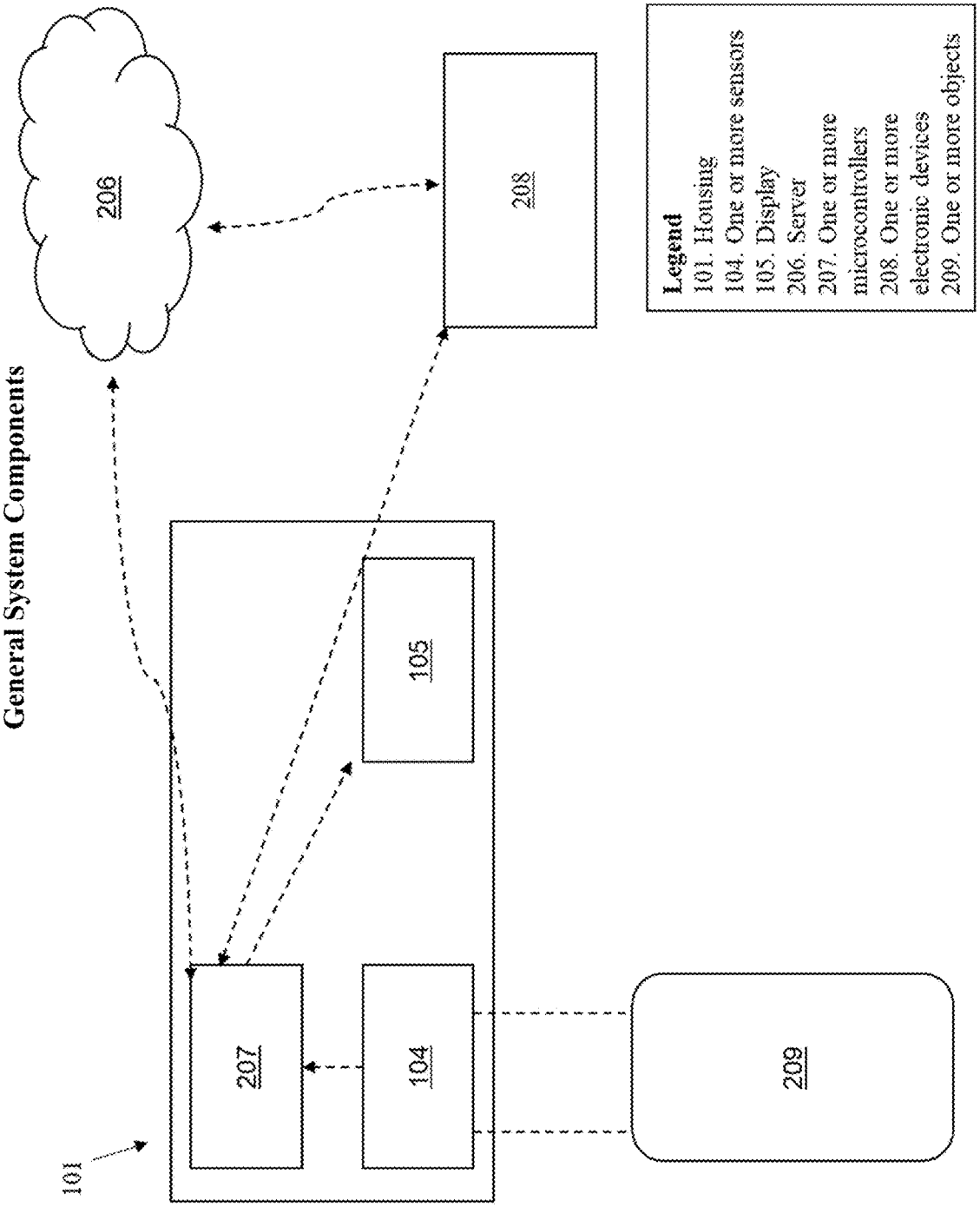
FIG. 2 shows a schematic of one embodiment of the general components of the system according to an embodiment disclosed herein.

Disclosed here in some embodiments are systems comprising the devices disclosed herein, and one or more additional system components. FIG. 2 demonstrates one embodiment of inventive system's components, and the flow of information, such as a wait-time or a number of objects that are permitted to enter a space before a predetermined threshold value is reached, between the components of the system. In some embodiments, the hardware housing 101 is configured to house the hardware, such as the one or more sensors 104, the display 105, and the one or more microcontrollers 207. In some embodiments, when an object 209 is detected by the one or more sensors 104, the one or more sensors 104 will transmit a signal comprising location data to the one or more microcontrollers 207. In some embodiments, the one or more microcontrollers 207 will perform a calculation, such as a wait-time to enter a space, a number of objects that are permitted to enter the space before a predetermined threshold value is reached, or a number of occupants in a queue at a space. In some embodiments, the one or more microcontrollers 207 will transmit a signal comprising the pertinent information, such as a value, to the display 105 for the display 105 to show the pertinent information. In some embodiments, the one or more microcontrollers 207 will also be in communication with the server 206. In some embodiments, the one or more microcontrollers 207 may transmit pertinent information to the server 206, and the server 206 may transmit information, such as an input from a user of one or more electronic devices indicating that the user is in the queue at the space for which the hardware housing 101 is located. In some embodiments, the server 206 may store information, such as the pertinent information, and the server 206 may transmit information to one or more electronic devices 208 when the user of one or more electronic devices selects the space at which the hardware housing 101 is located. In some embodiments, the one or more electronic devices 208 may comprise an application configured to show the pertinent information retrieved form the server 206, and the one or more electronic devices 208 are configured to transmit information, such as the information indicating that the user of the one or more electronic devices 208 is in a queue at a space at which the hardware housing 101 is located.

Figure 5:
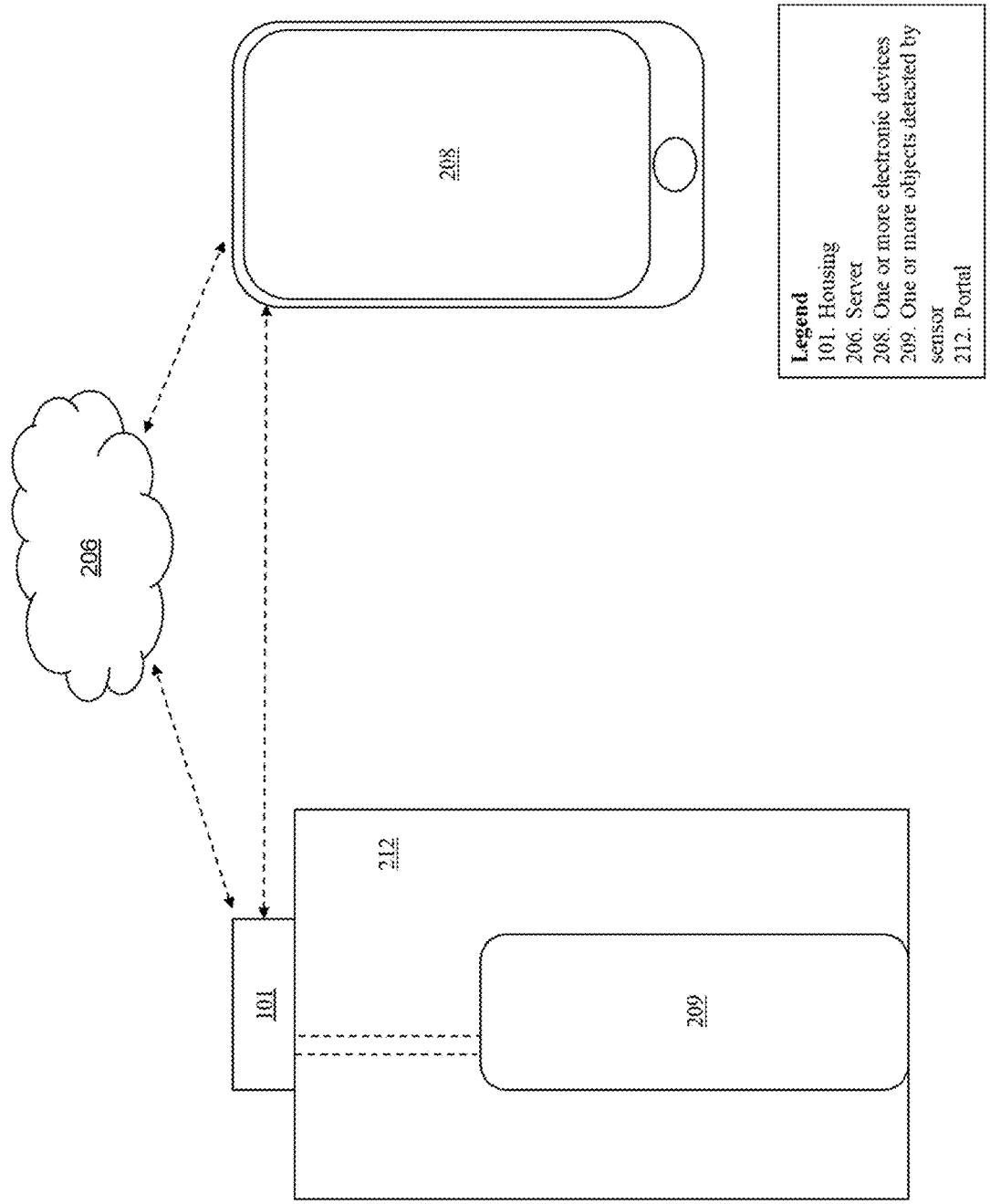
FIG. 5 shows a schematic of the one or more sensors detecting one or more objects and the connectivity between the housing, the server, and one or more electronic devices according to an embodiment disclosed herein.

FIG. 5 depicts, according to some embodiments disclosed herein, general system components and their wireless communications with each other. In some embodiments, the housing 101 detects one or more objects 209 either entering or exiting a space through a portal 212, such as a doorway, gate, or other suitable means of entering and exiting a space. In some embodiments, the housing 101 will transmit data and/or a value, such as a value, to the server 206 and/or one or more electronic devices 208. Additionally, in some embodiments, the housing 101 may establish a wireless communication with the one or more electronic devices 208 in order to determine the location of the one or more electronic devices 208. In some embodiments, this may be done to determine if the one or more electronic devices 208 are located in a queue at a space employing the housing 101. In some embodiments, the server 206 may transmit the data and/or value from the housing 101 to the one or more electronic devices 208. In some embodiments, the one or more electronic devices 208 may receive the data and/or value from the housing 101 and/or the server 206. Furthermore, in some embodiments, the one or more electronic devices 208 may transmit information gathered from the user of the one or more electronic devices 208 to the server 206 and/or the housing 101. In some embodiments, the one or more electronic devices 208 are in a queue to enter the space. In some embodiments, the one or more electronic devices 208 are not in a queue to enter the space. In some embodiments, the server 206 may also transmit information from the one or more electronic devices 208 to the housing 101.

Figure 7:
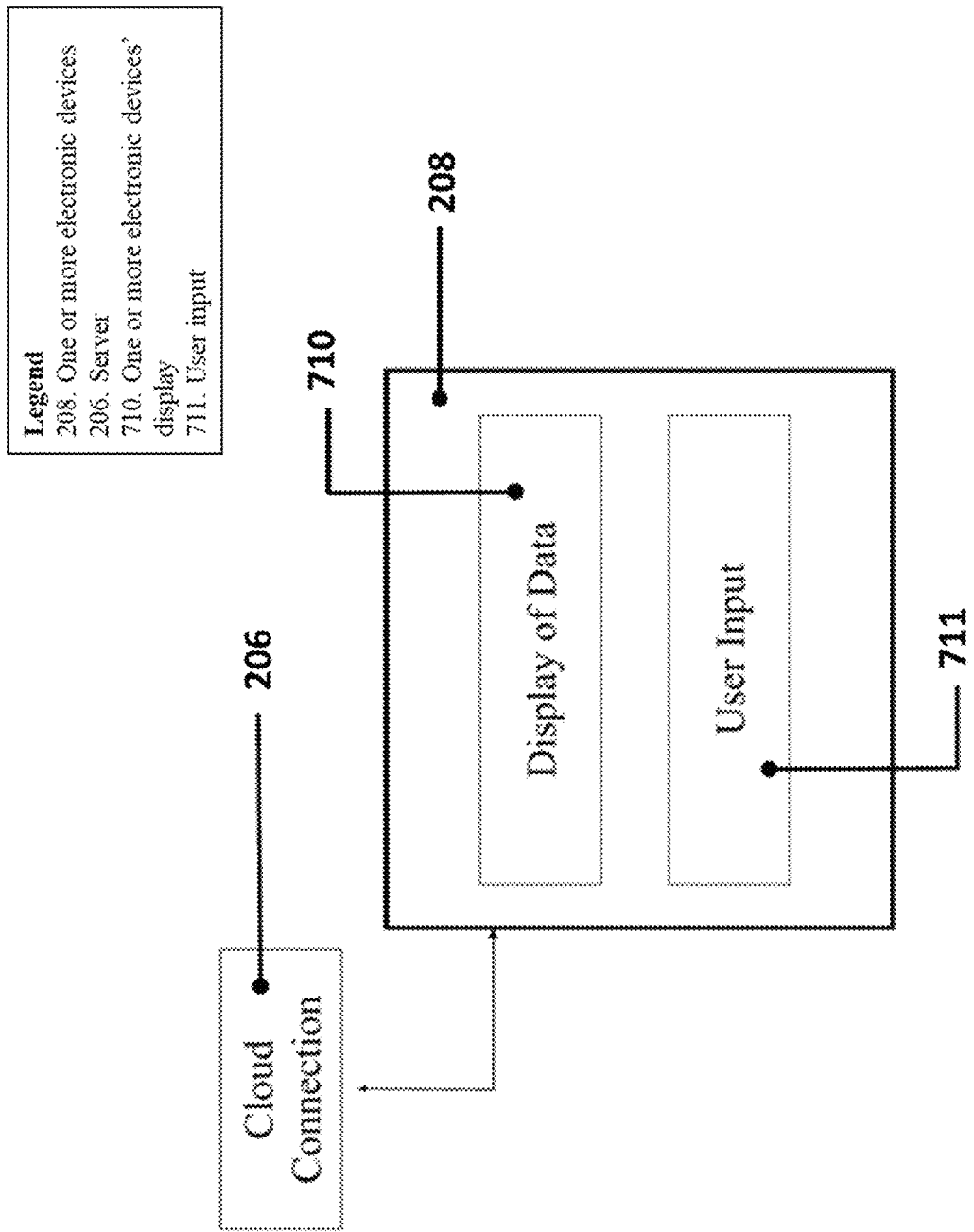
FIG. 7 shows one potential embodiment of the software-side of the one or more electronic devices according to an embodiment disclosed herein.

FIG. 7 depicts a wireless connection between a server 206, such as a cloud server through a cloud connection, and an embodiment of the one or more electronic devices 208, according to some embodiments disclosed herein. In some embodiments, the one or more electronic devices 208 may comprise an electronic device display 710 for displaying data and/or a value to the user of the one or more electronic devices 208. In some embodiments, the one or more electronic devices 208 may be configured to accept user input 711, such as a selection of a space employing a housing and/or the selection of whether the user is in a queue at a space employing a housing of the present application.

Figure 12B:
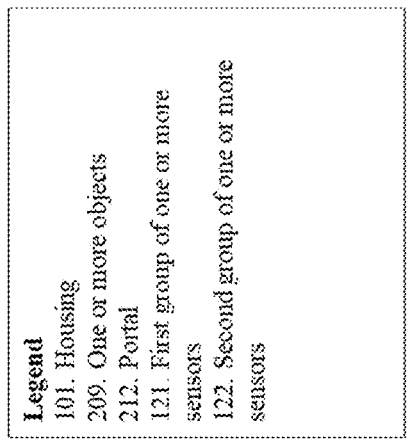
FIG. 12B shows a schematic of one or more objects exiting a space according to an embodiment disclosed herein.
Figure 12B:
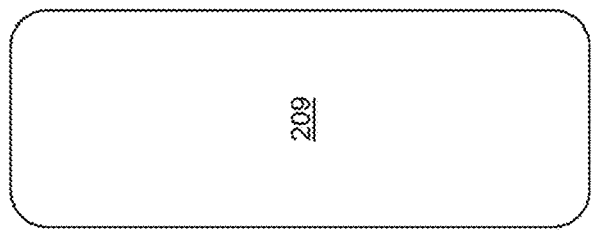
Figure 12B:
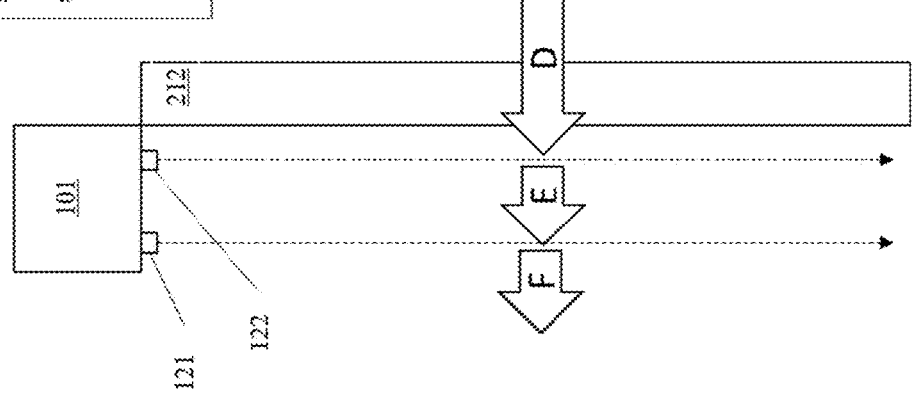
Figure 12A:
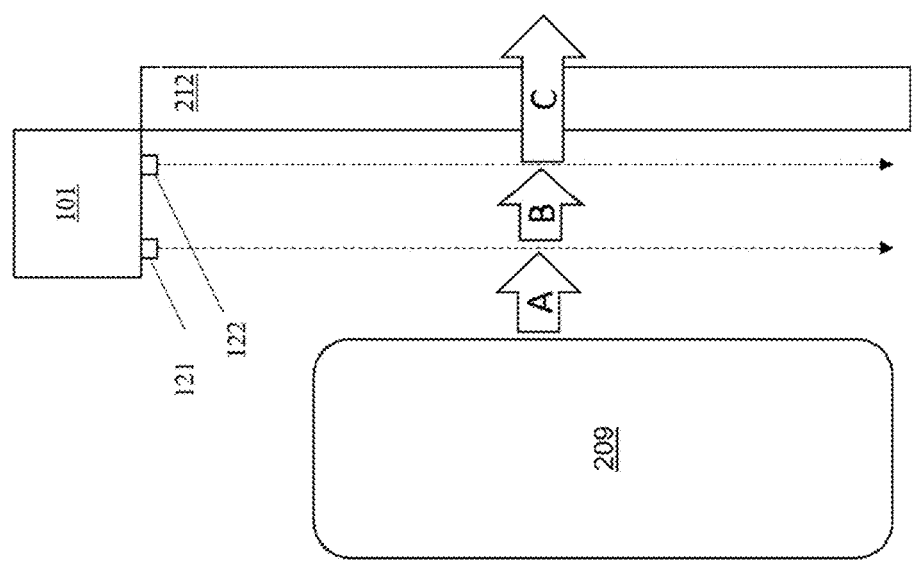
FIG. 12A shows a schematic of one or more objects entering a space according to an embodiment disclosed herein.

FIG. 12A, according to some embodiments disclosed herein, depicts an embodiment of a process that may be employed in detecting one or more objects 209 that enter a space through a portal 212 employing the housing 101. In some embodiments, a first group of one or more sensors 121 may detect one or more objects 209, before the second group of one or more sensors 122 detects the one or more objects 209. As represented by A, in some embodiments, when one or more objects 209 enters a space, the first group of one or more sensors 121 will detect the object. Subsequently, in some embodiments, as demonstrated by B, the one or more objects 209 entering will continue toward the second group of one or more sensors 122, at which point the second group of one or more sensors 122 will detect the one or more objects 209 entering. As indicated by C, in some embodiments, the one or more objects 209 entering may then proceed to enter the portal 212. In some embodiments, the microcontroller will determine that one or more objects 209 are entering a space due to the first group of one or more sensors 121 detecting the one or more objects 209 before the second group of one or more sensors 122.

FIG. 11B depicts, according to some embodiments disclosed herein, a illustrative process of determining when one or more objects 209 exits a space through the portal 212 employing the housing 101. In some embodiments, first, as depicted by D, when one or more objects 209 is exiting a space the second group of one or more sensors 122 will detect the one or more objects 209 exiting. In some embodiments, the one or more objects 209 exiting will continue away from the portal 212, toward the first group of one or more sensors 121, depicted as E. In some embodiments, the first group of one or more sensors 121 will then detect the one or more objects 209 exiting. In some embodiments, the one or more objects 209 exiting may continue moving away from the portal 212 as depicted by F. In some embodiments, the second group of one or more sensors 122 will detect the one or more objects 209 exiting before the first group of one or more sensors 121.

FIG. 12A and FIG. 12B, according to some embodiments disclosed herein, depict a process of determining whether one or more objects 209 is entering a space or exiting a space employing a housing 101.

FIG. 7 depicts a wireless connection between a server 206, such as a cloud server through a cloud connection, and an embodiment of the one or more electronic devices 208, according to some embodiments disclosed herein. In some embodiments, the one or more electronic devices 208 may comprise an electronic device display 710 for displaying data and/or a value to the user of the one or more electronic devices 208. In some embodiments, the one or more electronic devices 208 may be configured to accept user input 711, such as a selection of a space employing a housing and/or the selection of whether the user is in a queue at a space employing a housing of the present application.

A. Devices for Monitoring and/or Reporting a Value

Provided herein, in some embodiments, are devices comprising a hardware housing, one or more microcontrollers, and one or more sensors. In some embodiments, the device further comprises a display for displaying a value associated with a wait time and/or number of objects that may enter a space. In some embodiments, the device further comprises an output interface to permit a user of the device to input pertinent information, such as a value, for example to override the value calculated by the device.

Disclosed herein, in some embodiments, are devices for monitoring the capacity of a space, and/or providing an estimated wait time to enter and space. FIG. 1A shows a side view of the hardware housing 101 of the present disclosure, in accordance with an illustrative embodiment of the disclosure. In some embodiments, the hardware housing 101 is configured to house the hardware of the present disclosure and is configured to further comprise a cover 102 and a body 103. In some embodiments, the cover 102 is configured to allow access to internal components of the hardware housing. In some embodiments, the cover 102 may be removed when the components of the housing are required to be fixed or modified. In some embodiments, the body 103 is configured to carry the hardware components. In some embodiments, the one or more sensors 104 may be located on a surface of the hardware housing 101, such as the bottom. In some embodiments, the display 105 is configured to show pertinent information, such as a wait-time, a number of objects permitted to enter a space, and/or a maximum occupancy.

Figure 1B:
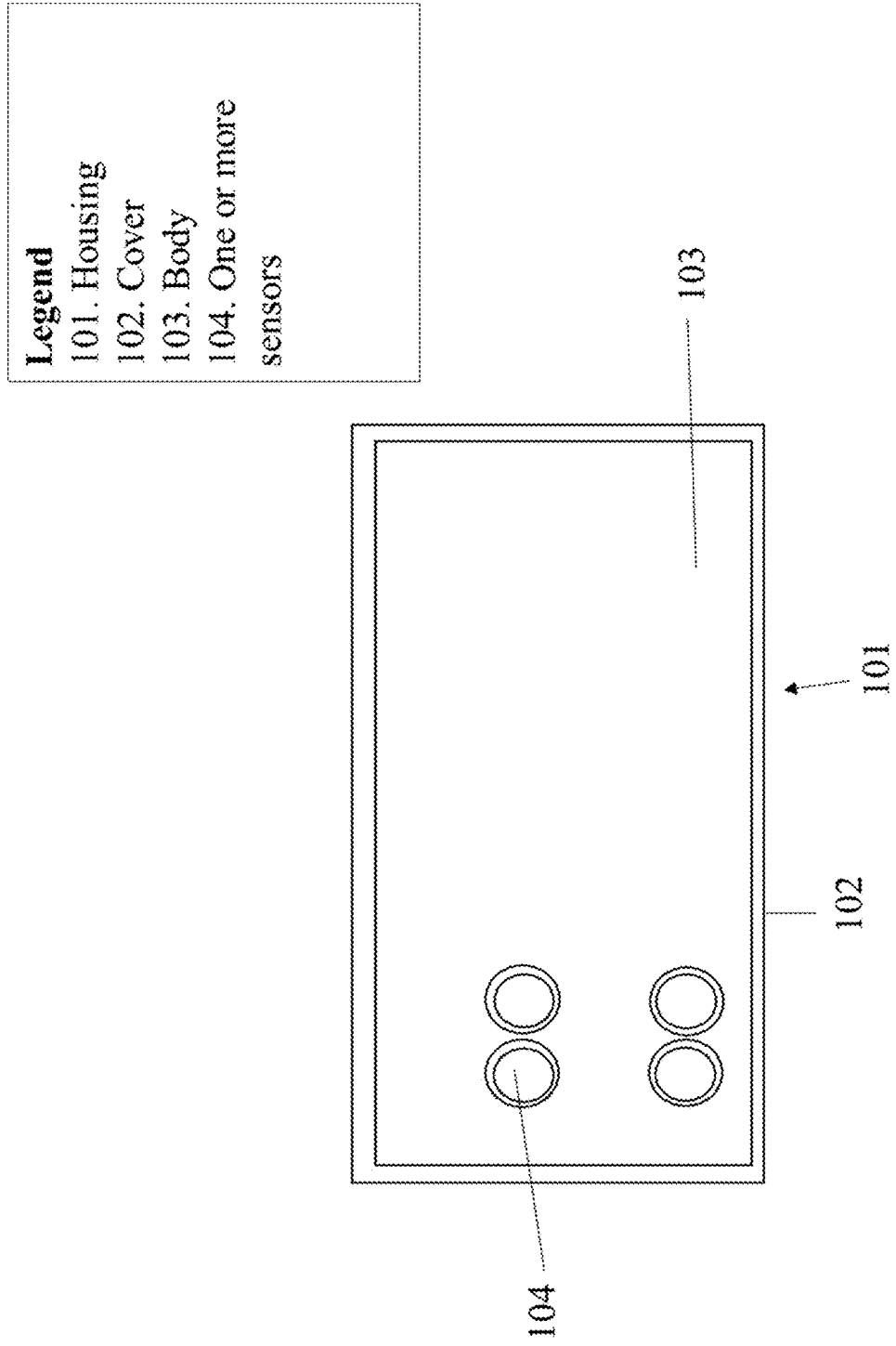
FIG. 1B shows a bottom view of one embodiment of the housing according to an embodiment disclosed herein.

FIG. 1B shows a bottom view of the hardware housing 101 according to some embodiments herein. In an embodiment of the disclosure, the hardware housing 101 comprises an opening on the bottom to allow for one or more sensors 104 to protrude from the body 103. In some embodiments, the one or more sensors 104 are configured to detect, and differentiate between, an object entering a space and an object exiting the space. In some embodiments, the one or more sensors 104 may transmit a signal comprising location data indicating that an object has entered the space and/or that an object has exited the space.

Figure 6:
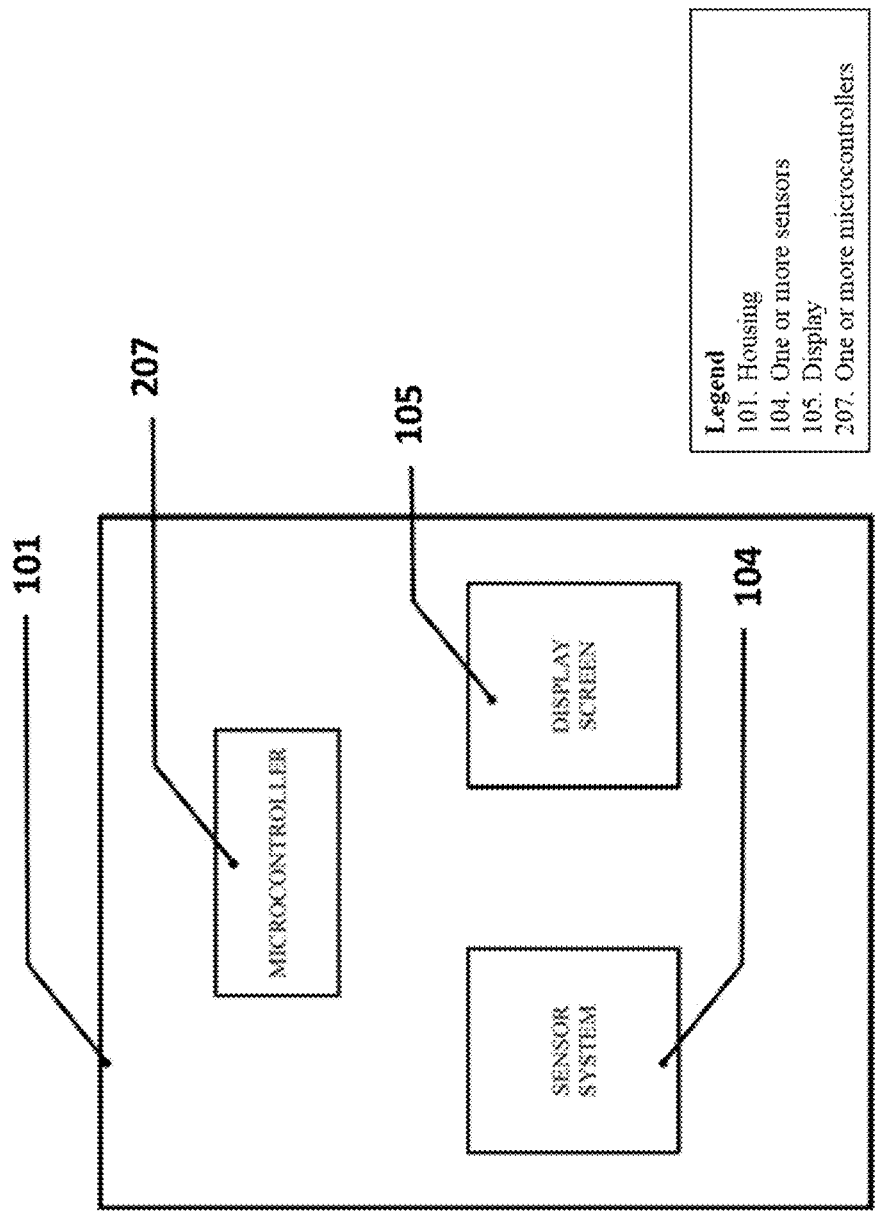
FIG. 6 shows a schematic of one potential embodiment of the hardware components of the housing according to an embodiment disclosed herein.

FIG. 6 depicts the general components of the housing 101, according to some embodiments disclosed herein. In some embodiments, the housing 101 is configured to comprise a sensor system 104, a display screen 105, and one or more microcontrollers 207. In some embodiments, the sensor system 104 may be in or on any suitable location of the housing 101, such as on the bottom of the housing 101. In some embodiments, the display screen 105 may be on or in any suitable location of the housing 101, but the display screen 105 will typically be disposed on a surface of the housing 101, such as on a front side of the housing 101. In some embodiments, the one or more microcontrollers 207 may be on or inside of the housing 101; however, the one or more microcontrollers are preferably located within the housing 101.

1. Housing

Provided herein, in some embodiments, are devices comprising a housing. As used herein, "housing" is used synonymously with "hardware housing." In some embodiments, he housing may be useful for containing hardware, such as one or more sensors, one or more microcontrollers, and/or a display. The housing may also help ensure that the hardware contained within is easily movable and storable. Additionally, the housing may a add a layer of safety, by helping to ensure that any wires that may be contained within the housing are not exposed.

In some embodiments, the housing comprises one or more sensors, one or more microcontrollers, and a display. In some embodiments, the housing comprises hardware. In some embodiments, the housing comprises integrated hardware. In some embodiments, the integrated hardware comprises one or more sensors, one or more microcontrollers, and a display. In some embodiments the housing further comprises a cover and a body. The body and cover may be any suitable shape, such as a rectangle or square, or size. The body and cover may be composed of any suitable material, such as a metal, metal alloy, plastic, silicone, or a combination thereof. In some embodiments, the housing comprises an output interface. The output interface may be located on the inside of the housing, the outside of the housing, or on a device separate from the housing.

In some embodiments, the housing comprises a means of attachment. The housing may be attached to a portal, such as a doorway. Appropriate means of attachment include, but are not limited to, one or more hooks, an adhesive, one or more nails, one or more screws, or a hook-and-eye closure system. In some cases, the means of attachment comprise one or more hooks. In some cases, the means of attachment comprises two hooks. The one or more hooks may be useful for attaching the housing to the frame of the portal or molding surrounding at least a portion of the portal. The one or more hooks may be used to attach the housing to a doorway, a gate, or other suitable portal for entering or exiting a space. The one or more hooks may be useful for a means for easily attaching and removing the housing from a portal without installation of the housing to the portal. However, the housing may be attached directly to a portal, such as through installation. Alternatively, the housing may be placed near the portal, such as above the portal, such as by placing the portal on a ledge above a doorway. Alternatively, the housing may be installed or placed on a ceiling above a portal. The housing may also be placed near the portal and thus may not require a direct means of attachment to the portal itself. For example, the housing may be placed on an object next to the portal, such as a table.

In some cases, the means of attachment comprises one or more nails and/or one or more screws. In some cases, the means of attachment comprises an adhesive. In some cases, the adhesive is a hook and loop fastener, such as Velcro®. In some cases, the housing is removable. In some cases, the housing is installed into an area, such as any area around a portal. In some cases, the housing is not installed, such as by placing the portal on an object near the portal, such as a table or chair.

In some embodiments, the housing is located at a top portion of the portal. In some cases, the housing is located on a vertical axis of the portal. In some cases, the housing is located below the portal. In some cases, the housing is located next to the portal and is not in physical contact with the portal. In some cases, the housing is located within the portal. In some cases, a portion of the housing is located on the portal while a different portion of the housing is located within the portal.

The portal may receive power from any acceptable source of power. In some cases, the housing receives power from a power source. In some cases, the power source is a battery. In some cases, the battery is a rechargeable battery. In some cases, the power source is a power cord, such as one that may be plugged into any appropriate outlet. Additionally, the housing may receive power from a renewable energy source, such as through a solar panel or a wind turbine. In some embodiments, the housing comprises a solar panel. In some embodiments, the housing comprises a wind turbine.

In some embodiments, the housing further comprises additional components, such as a signal converter and/or a signal filter. In some embodiments, the housing comprises jumper wires.

2. One or More Sensors

Provided herein, in some embodiments, are methods, devices, and systems comprising one or more sensors. The one or more sensors may be used in any of the methods, devices, and systems described herein, such as in a method of reporting a value. The one or more sensors may be included in a system for use in monitoring a value, such as a wait time and/or monitoring a number of objects that are permitted to enter a space before a threshold value is reached. The one or more sensors may be useful for detecting the entering and exiting of one or more objects into or out of a space.

The one or more sensors may be configured to detect whether an object is entering or exiting a space. In some embodiments, the one or more sensors detects a signal corresponding with one or more objects. In some embodiments, the signal is an ultrasonic signal. In some embodiments, the one or more sensors is configured to transmit a signal to one or more microcontrollers. In some embodiments, the one or more sensors generates location data in response to one or more objects entering a space or exiting the space. In some embodiments, the one or more sensors is configured to transmit the location data for one or more objects entering or exiting the space. In some embodiments, the one or more sensors transmits the location data to the one or more microcontrollers.

The location data may be transmitted when the one or more sensors detects an object entering a space and/or an object exiting the space. The location data may be indicative of whether an object entered a space and/or whether an object exited a space. In some embodiments, the one or more microcontrollers receive the location data. Location data may be indicative of one or more objects entering a space and/or one or more objects entering a space. Location data indicative of one or more objects entering a space may differ from the location data indicative of one or more objects entering the space.

In some embodiments, the housing comprises a sensor system, such as a dual sensor system. In some embodiments, the sensor system comprises a first group of one or more sensors and a second group of one or more sensors. The one or more sensors may detect an object is entering a space by the first group of sensors detecting a first object of the one or more objects before the second group of sensors detects the first object of one or more objects. In some embodiments, the one or more sensors detect that the first object of one or more objects is exiting by the second group of sensors detecting the first object of one or more objects before the first group of sensor detects the first object of one or more objects. The detection of the entering and/or exiting of an object by the one or more sensors may be converted to a signal, such one comprising location data, that is transmitted to the one or more microcontrollers.

In some embodiments, the first group of sensors comprise at least one sensor. In some embodiments, the first group of sensors comprise at least two sensors. In some embodiments, the first group of sensors comprise one sensor. In some embodiments, the first group of sensors comprise two sensors. In some embodiments, the first group of sensors comprise three sensors. In some embodiments, the first group of sensors comprise four sensors. In some embodiments, the second group of sensors comprise at least one sensor. In some embodiments, the second group of sensors comprise at least two sensors. In some embodiments, the second group of sensors comprise one sensor. In some embodiments, the second group of sensors comprise two sensors. In some embodiments, the second group of sensors comprise three sensors. In some embodiments, the second group of sensors comprise four sensors. In some embodiments, the housing comprises the first group of sensors. In some embodiments, the housing comprises the second group of sensors. In some embodiments, the housing comprises the first group of sensors and the second group of sensors. In some embodiments, the first group of sensors are not contained within the housing or on the housing. In some embodiments, the second group of sensors are not contained within the housing or on the housing. In some embodiments, the first group of sensors and the second group of sensors are located separately from the housing. In some embodiments, the housing comprises the first group of sensors while the second group of sensors is located at a separate location. In some embodiments, the housing comprises the second group of sensors while the first group of sensors is located at a different location.

In some embodiments, the first group of sensors are located at a distance from the second group of sensors. In some embodiments, the distance is about 1 in. to about 12 in. In some embodiments, the distance is about 1 in. to about 2 in., about 1 in. to about 3 in., about 1 in. to about 4 in., about 1 in. to about 5 in., about 1 in. to about 6 in., about 1 in. to about 7 in., about 1 in. to about 8 in., about 1 in. to about 9 in., about 1 in. to about 10 in., about 1 in. to about 11 in., about 1 in. to about 12 in., about 2 in. to about 3 in., about 2 in. to about 4 in., about 2 in. to about 5 in., about 2 in. to about 6 in., about 2 in. to about 7 in., about 2 in. to about 8 in., about 2 in. to about 9 in., about 2 in. to about 10 in., about 2 in. to about 11 in., about 2 in. to about 12 in., about 3 in. to about 4 in., about 3 in. to about 5 in., about 3 in. to about 6 in., about 3 in. to about 7 in., about 3 in. to about 8 in., about 3 in. to about 9 in., about 3 in. to about 10 in., about 3 in. to about 11 in., about 3 in. to about 12 in., about 4 in. to about 5 in., about 4 in. to about 6 in., about 4 in. to about 7 in., about 4 in. to about 8 in., about 4 in. to about 9 in., about 4 in. to about 10 in., about 4 in. to about 11 in., about 4 in. to about 12 in., about 5 in. to about 6 in., about 5 in. to about 7 in., about 5 in. to about 8 in., about 5 in. to about 9 in., about 5 in. to about 10 in., about 5 in. to about 11 in., about 5 in. to about 12 in., about 6 in. to about 7 in., about 6 in. to about 8 in., about 6 in. to about 9 in., about 6 in. to about 10 in., about 6 in. to about 11 in., about 6 in. to about 12 in., about 7 in. to about 8 in., about 7 in. to about 9 in., about 7 in. to about 10 in., about 7 in. to about 11 in., about 7 in. to about 12 in., about 8 in. to about 9 in., about 8 in. to about 10 in., about 8 in. to about 11 in., about 8 in. to about 12 in., about 9 in. to about 10 in., about 9 in. to about 11 in., about 9 in. to about 12 in., about 10 in. to about 11 in., about 10 in. to about 12 in., or about 11 in. to about 12 in. In some embodiments, the distance is about 1 in., about 2 in., about 3 in., about 4 in., about 5 in., about 6 in., about 7 in., about 8 in., about 9 in., about 10 in., about 11 in., or about 12 in. In some embodiments, the distance is at least about 1 in., about 2 in., about 3 in., about 4 in., about 5 in., about 6 in., about 7 in., about 8 in., about 9 in., about 10 in., or about 11 in. In some embodiments, the distance is at most about 2 in., about 3 in., about 4 in., about 5 in., about 6 in., about 7 in., about 8 in., about 9 in., about 10 in., about 11 in., or about 12 in. In some embodiments, the distance is about 1 yard to about 10 yards. In some embodiments, the distance is about 1 yard to about 2 yards, about 1 yard to about 3 yards, about 1 yard to about 4 yards, about 1 yard to about 5 yards, about 1 yard to about 6 yards, about 1 yard to about 7 yards, about 1 yard to about 8 yards, about 1 yard to about 9 yards, about 1 yard to about 10 yards, about 2 yards to about 3 yards, about 2 yards to about 4 yards, about 2 yards to about 5 yards, about 2 yards to about 6 yards, about 2 yards to about 7 yards, about 2 yards to about 8 yards, about 2 yards to about 9 yards, about 2 yards to about 10 yards, about 3 yards to about 4 yards, about 3 yards to about 5 yards, about 3 yards to about 6 yards, about 3 yards to about 7 yards, about 3 yards to about 8 yards, about 3 yards to about 9 yards, about 3 yards to about 10 yards, about 4 yards to about 5 yards, about 4 yards to about 6 yards, about 4 yards to about 7 yards, about 4 yards to about 8 yards, about 4 yards to about 9 yards, about 4 yards to about 10 yards, about 5 yards to about 6 yards, about 5 yards to about 7 yards, about 5 yards to about 8 yards, about 5 yards to about 9 yards, about 5 yards to about 10 yards, about 6 yards to about 7 yards, about 6 yards to about 8 yards, about 6 yards to about 9 yards, about 6 yards to about 10 yards, about 7 yards to about 8 yards, about 7 yards to about 9 yards, about 7 yards to about 10 yards, about 8 yards to about 9 yards, about 8 yards to about 10 yards, or about 9 yards to about 10 yards. In some embodiments, the distance is about 1 yard, about 2 yards, about 3 yards, about 4 yards, about 5 yards, about 6 yards, about 7 yards, about 8 yards, about 9 yards, or about 10 yards. In some embodiments, the distance is at least about 1 yard, about 2 yards, about 3 yards, about 4 yards, about 5 yards, about 6 yards, about 7 yards, about 8 yards, or about 9 yards. In some embodiments, the distance is at most about 2 yards, about 3 yards, about 4 yards, about 5 yards, about 6 yards, about 7 yards, about 8 yards, about 9 yards, or about 10 yards. In some embodiments, the distance is about 1 mile to about 10 miles. In some embodiments, the distance is about 1 mile to about 2 miles, about 1 mile to about 3 miles, about 1 mile to about 4 miles, about 1 mile to about 5 miles, about 1 mile to about 6 miles, about 1 mile to about 7 miles, about 1 mile to about 8 miles, about 1 mile to about 9 miles, about 1 mile to about 10 miles, about 2 miles to about 3 miles, about 2 miles to about 4 miles, about 2 miles to about 5 miles, about 2 miles to about 6 miles, about 2 miles to about 7 miles, about 2 miles to about 8 miles, about 2 miles to about 9 miles, about 2 miles to about 10 miles, about 3 miles to about 4 miles, about 3 miles to about 5 miles, about 3 miles to about 6 miles, about 3 miles to about 7 miles, about 3 miles to about 8 miles, about 3 miles to about 9 miles, about 3 miles to about 10 miles, about 4 miles to about 5 miles, about 4 miles to about 6 miles, about 4 miles to about 7 miles, about 4 miles to about 8 miles, about 4 miles to about 9 miles, about 4 miles to about 10 miles, about 5 miles to about 6 miles, about 5 miles to about 7 miles, about 5 miles to about 8 miles, about 5 miles to about 9 miles, about 5 miles to about 10 miles, about 6 miles to about 7 miles, about 6 miles to about 8 miles, about 6 miles to about 9 miles, about 6 miles to about 10 miles, about 7 miles to about 8 miles, about 7 miles to about 9 miles, about 7 miles to about 10 miles, about 8 miles to about 9 miles, about 8 miles to about 10 miles, or about 9 miles to about 10 miles. In some embodiments, the distance is about 1 mile, about 2 miles, about 3 miles, about 4 miles, about 5 miles, about 6 miles, about 7 miles, about 8 miles, about 9 miles, or about 10 miles. In some embodiments, the distance is at least about 1 mile, about 2 miles, about 3 miles, about 4 miles, about 5 miles, about 6 miles, about 7 miles, about 8 miles, or about 9 miles. In some embodiments, the distance is at most about 2 miles, about 3 miles, about 4 miles, about 5 miles, about 6 miles, about 7 miles, about 8 miles, about 9 miles, or about 10 miles.

The sensors may be in any location appropriate for detecting one or more objects entering and/or exiting a space. In some embodiments, the one or more sensors are located on the bottom of the housing. In some embodiments, the one or more sensors are located on a side of the housing opposite of the side of the housing comprising a cover. In some embodiments, the one or more sensors are located on the top of the housing. In some embodiments, the one or more sensors are not on the housing. In some embodiments, a portion of the one or more sensors is contained within the housing, while a separate portion of the one or more sensors is exposed from the housing. In some embodiments, the one or more sensors are attached to the housing, but are located outside of the housing. In some embodiments, the one or more sensors are not attached to the housing. The sensors may be attached by any of the means of attachment disclosed herein to a portal, near a portal, or within a portal. For example, the sensors may be located within the ground below a portal while the housing is located at a separate area, such as next to the portal.

In some embodiments, the one or more sensors is in wired communication with the one or more microcontrollers. In some embodiments, the one or more sensors are in wireless communication with the one or more microcontrollers.

The one or more sensors may comprise any suitable sensor to detect an object. In some embodiments, the one or more sensors comprise one type of sensor. In some embodiments, the one or more sensors comprise a mix of different types of sensors. The mix of different sensors may be a combination of sensors described herein. In some embodiments, the one or more sensors comprise an ultrasonic sensor. In some embodiments, the one or more ultrasonic sensors receive an ultrasonic signal. In some embodiments, the ultrasonic signal corresponds with one or more objects entering a space or exiting the space. In some embodiments, the one or more sensors comprise a motion sensor. In some embodiments, the one or more sensors comprise an infrared sensor. In some embodiments, the one or more sensors comprise a passive infrared (PIR) sensor. In some embodiments, the one or more sensors comprise a microwave sensor. In some embodiments, the one or more sensors comprise a tomographic sensor. In some embodiments, the one or more sensors comprise two ultrasonic sensors. In some embodiments, the one or more sensors comprise four ultrasonic sensors. In some embodiments, the one or more sensors comprise two ultrasonic sensors. In some embodiments, the sensors comprise a global positioning system (GPS). In some embodiments, the one or more sensors are comprise the use of imaging technology.

The one or more sensors may be configured to generate location data corresponding with one or more objects entering a space or exiting the space. The sensor may comprise a sensitivity setting for use in determining whether to transmit location data. The one or more sensors may be set to generate location data when an object of a certain size passes by the one or more sensors. In such a case, if the sensitivity is set and an object of a size below the size for detection required for the sensitivity setting of the one or more sensors passes through the portal, the one or more sensors will not transmit the location data to the one or more microcontrollers. If an object above the object size for which the sensitivity setting is set passes through the portal the one or more sensors will transmit the location data to the one or more microcontrollers.

The one or more sensors may be of any appropriate size. In some embodiments, the size of the one or more sensors are 0.25 inches. In some embodiments, the size of the one or more sensors are 0.5 inches. In some embodiments, the size of the one or more sensors are 0.75 inches. In some embodiments, the size of the one or more sensors are 1 inch. In some embodiments, the size of the one or more sensors are 1.25 inches. In some embodiments, the size of the one or more sensors are 1.5 inches. In some embodiments, the size of the one or more sensors are 2 inches. In some embodiments, the size of the one or more sensors are 3 inches. In some embodiments, the size of the one or more sensors are 4 inches. In some embodiments, the size of the one or more sensors are 5 inches. In some embodiments, the size of the one or more sensors are 6 inches. In some embodiments, the size of the one or more sensors are 1 foot. In some embodiments, the size of the one or more sensors are 1.5 feet. In some embodiments, the size of the one or more sensors are 2 feet. In some cases, the size of the one or more sensors refers to the circumference of the one or more sensors. In some cases, the size of the one or more sensors refers to the diameter of the one or more sensors. In some cases, the size of the one or more sensors refers to the length of the one or more sensors. In some cases, the size of the one or more sensors refers to the area of the one or more sensors. In some embodiments, the size of the one or more sensors refers to the size of one sensor of the one or more sensors. In some embodiments, the size of the one or more sensors refers to the size of a first group of one or more sensors. In some embodiments, the size of the one or more sensors refers to the size of a second group of one or more sensors. In some embodiments, the size of the one or more sensors refers to the size of all of the one or more sensors.

The one or more sensors may be any appropriate shape. The one or more sensors may comprise any appropriate number of sides, including, but not limited to, zero sides. In some cases, the shape of the one or more sensors is a circle. In some cases, the shape of the one or more sensors is a square. In some cases, the shape of the one or more sensors is a rectangle. In some cases, the shape of the one or more sensors is a triangle. In some cases, the shape of the one or more sensors is an oval. In some cases, the shape of the one or more sensors is a circle. In some cases, the shape of the one or more sensors is a rhombus.

3. One or More Microcontrollers

Provided herein, in some embodiments, are methods, devices, and systems comprising one or more microcontrollers. The one or more microcontrollers may be used in any of the methods, devices, and systems described herein, such as in a method of reporting a value. The one or more microcontrollers may be included in a system for use in monitoring a value, such as a wait time and/or monitoring a number of objects that are permitted enter a space before a threshold value is reached. The one or more microcontrollers may be useful for detecting one or more objects entering and/or exiting a space. In some embodiments, the one or more microcontrollers is configured to make time calculations, such as the calculations as described herein, and connect to a server, such as a cloud server.

A microcontroller is a computer controller where the data processing logic and control are on a single integrated circuit, or a small number of integrated circuits. The one or more microcontrollers may contain arithmetic, logic, and control circuitry required to perform the functions of a device's central processing unit. The one or more microcontrollers may also be capable of interpreting and executing program instructions and performing arithmetic operations. The one or more microcontrollers may be useful in processing location data from the one or more sensors, calculating a value, and transmitting the value.

The one or more microcontrollers may be located at or in any suitable space. In some embodiments, the one or more microcontrollers are located within the housing. In some embodiments, the one or more microcontrollers are located outside of the housing, such as within a device that is separate from the one or more sensors.

In some embodiments, the one or more microcontrollers comprise one microcontroller. In some embodiments, the one or more microcontrollers comprise more than one microcontroller. In some embodiments, the microcontroller comprise two microcontrollers.

The one or more microcontrollers may be in communication with one or more electronic devices, a network, and a server. In some embodiments, the one or more microcontrollers communicates with a network. The microcontroller may use the network to transmit a signal from the one or more microcontrollers to a network or server and/or receive a signal from a network, server, and one or more electronic devices. In some embodiments, the network is a wi-fi network. In some embodiments, the network is a cellular network. In some embodiments, the microcontroller is connected to a network via an ethernet cable. In some embodiments, the network is a personal area network. In some embodiments, the network is a local area network. In some embodiments, the network is a wireless local area network. In some embodiments, the network is a wide area network. In some embodiments, the network is a system area network. In some embodiments, the network is a campus area network. In some embodiments, the network is a metropolitan area network. In some embodiments, the network is a storage-area network. In some embodiments, the network is a system area network. In some embodiments, the network is a passive optical local area network. In some embodiments, the network is an enterprise private network. In some embodiments, the network is a virtual private network.

In some embodiments, the one or more microcontrollers is in wireless communication with a server, such as a cloud server. In some embodiments, the one or more microcontrollers utilizes a network to transmit a signal, such as a signal comprising a value, to a server. In some embodiments, the microcontroller transmits a signal to a cloud server. In some embodiments, the microcontroller receives a signal from the one or more sensors. In some embodiments, the one or more microcontrollers receives a signal from the server. In some embodiments, the one or more microcontrollers receives a signal from a cloud server. In some embodiments, the one or more microcontrollers is in wireless communication with one or more electronic devices. The wireless communication may be useful for transferring information, such as a value, from the one or more microcontrollers to a component outside of the one or more microcontrollers, such as a server and one or more electronic devices.

In some embodiments, the one or more microcontrollers transmits a signal comprising a value. In some embodiments, the one or more microcontrollers transmits a signal comprising a value through a short-range communication. In some embodiments, the one or more microcontrollers transmits the value to a server. In some embodiments, the one or more microcontrollers transmits the value to one or more electronic devices. In some embodiments, the one or more microcontrollers receives a signal from a server. In some embodiments, the one or more microcontrollers transmits a signal to the display. In some embodiments, the display receives a signal from one or more microcontrollers. In some embodiments, the one or more microcontrollers receives a signal from one or more electronic devices. In some embodiments, the signal is transmitted from one or more electronic devices located at a location outside of a predefined area outside of the space. In some embodiments, the signal is transmitted from one or more electronic devices located at a location outside of the space. In some embodiments, the signal is transmitted from one or more electronic devices located at a location in a close proximity to the housing, such as in the predefined area outside of the space. In some embodiments, the signal is transmitted from the one or more electronic devices in the predefined area outside of the space. In some embodiments, the signal is transmitted from one or more electronic devices located in a queue at the space in which the housing is employed.

The one or more microcontrollers may be any suitable type of microcontroller. In some embodiments, the one or more microcontrollers comprises a complex instruction set computer ("CISC"). In some embodiments, the one or more microcontrollers comprises a reduced instruction set computer ("RISC"). In some embodiments, the one or more microcontrollers comprises one type of microcontroller. In some embodiments, the one or more microcontrollers comprises one or more types of microcontrollers. In some embodiments, the one or more microcontrollers comprise two types of microcontrollers, such as a CISC microcontroller and a RISC microcontroller.

a. One or More Microcontrollers as an Edge Device

In some embodiments, the one or more microcontrollers is an edge device. Edge devices may be used to help gather data and may provide an entry point into enterprise or service core networks. Additionally, edge devices may be used to translate between one type of network protocol and another. In some embodiments, the one or more microcontrollers is in wireless communication with one or more electronic devices.

One or more microcontrollers with edge capabilities may be useful in determining the number objects in a predefined area, such as a predefined area outside of the space. In some embodiments, the predefined area is an area outside of the space. In some embodiments, the predefined area is an area where objects will wait to enter the space, such as a queue. In some embodiments, the predefined area is within the space. In some embodiments, the one or more microcontrollers will differentiate between wireless communications established from one or more electronic devices inside the space with wireless communication from one or more electronic devices outside of the space. Such a feature will be useful in determining the number of one or more electronic devices that are within the predefined area, such as a queue to enter the space. Additionally, this feature may be useful when used with a short-range communication between the one or more electronic devices and the one or more microcontrollers.

Figure 11:
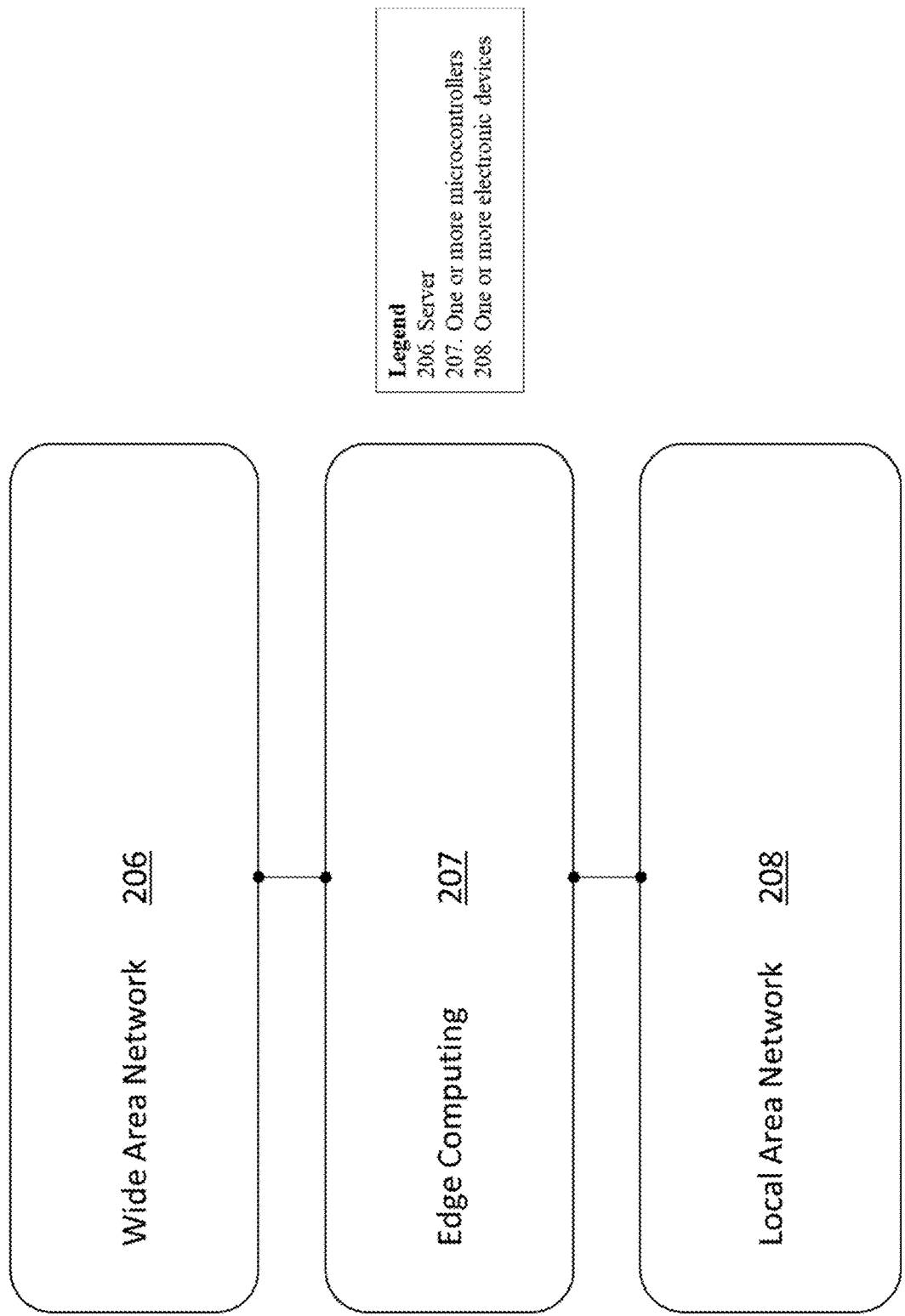
FIG. 11 shows, according to an embodiment disclosed herein, the connection between one or more electronic devices on a local area network in connection with one or more microcontrollers capable of edge computing, which are in communication with a server acting as a wide area network.

FIG. 11, according to some embodiments disclosed herein, is a depiction of one or more microcontrollers 207 acting as an edge device and capable of edge computing. In some embodiments, one or more electronic devices 208 acting on a local area network may establish a connection to the one or more microcontrollers 207. In some embodiments, the connection between the one or more electronic devices 208 and the one or more microcontrollers 207 may be any appropriate connection, such as through the use of a short-range wireless communication. In some embodiments, the one or more microcontrollers 207 may determine whether a user of the one or more electronic devices 208 is in a queue at a space employing the housing of the housing disclosed herein based the proximity of the one or more electronic devices 208 to the one or more microcontrollers 207 and/or the ability of the one or more electronic devices 208 to establish a direct wireless connection to the one or more microcontrollers 207. In some embodiments, the one or more microcontrollers 207 may transmit data and/or a value, such as a value calculated based on at least in part a number of direct wireless connections between the one or more electronic devices 208 and the one or more microcontrollers 207, to a server 206 acting as a wide area network. In some embodiments, the server 206 may then be used to send the data and/or the value to one or more electronic devices 206 that may be located in a queue at the space employing the housing and/or at a location remote from the space employing the housing.

In some embodiments, the communication between the one or more microcontrollers and the one or more electronic devices is a short-range (Bluetooth®) communication. In some embodiments, the short-range communication is a communication that occurs within the predefined area. In some embodiments, the wireless communication between the one or more electronic devices and the one or more microcontrollers is a wireless communication comprising a maximum connectivity range. In some embodiments, the maximum connectivity range is up to a maximum of 80 feet. In some embodiments, the maximum connectivity range is up to a maximum of 70 feet. In some embodiments, the maximum connectivity range is up to a maximum of 60 feet. In some embodiments, the maximum connectivity range is up to a maximum of 50 feet. In some embodiments, the maximum connectivity range is up to a maximum of 40 feet. In some embodiments, the maximum connectivity range is up to a maximum of 30 feet. In some embodiments, the maximum connectivity range is up to a maximum of 40 feet. In some embodiments, the maximum connectivity range is up to a maximum of 50 feet. In some embodiments, the maximum connectivity range is up to a maximum of 60 feet. In some embodiments, the maximum connectivity range is up to a maximum of 70 feet. In some embodiments, the maximum connectivity range is up to a maximum of 80 feet. In some embodiments, the maximum connectivity range is up to a maximum of 90 feet. In some embodiments, the maximum connectivity range is up to a maximum of 100 feet. In some embodiments, the maximum connectivity range is up to a maximum of 120 feet. In some embodiments, the maximum connectivity range is up to a maximum of 140 feet. In some embodiments, the maximum connectivity range is up to a maximum of 160 feet. In some embodiments, the maximum connectivity range is up to a maximum of 180 feet. In some embodiments, the maximum connectivity range is up to a maximum of 5 meters. In some embodiments, the maximum connectivity range is up to a maximum of 10 meters. In some embodiments, the maximum connectivity range is up to a maximum of 20 meters. In some embodiments, the maximum connectivity range is up to a maximum of 30 meters. In some embodiments, the maximum connectivity range is up to a maximum of 40 meters. In some embodiments, the maximum connectivity range is up to a maximum of 50 meters. In some embodiments, the maximum connectivity range is up to a maximum of 60 meters.

In some embodiments, the short-range communication is a communication of up to a maximum of 20 feet. In some embodiments, the maximum connectivity range is up to a maximum of 10 feet. In some embodiments, the communication between the microcontroller and the one or more electronic devices is a wi-fi connection. Additionally, the one or more microcontrollers may connect to one or more electronic devices and a network, such as a wi-fi network or a cellular network.

In some embodiments, the one or more microcontrollers are configured to calculate a value. In some embodiments, the one or more microcontrollers are individually programmed to implement a method. In some embodiments, the one or more microcontrollers are collectively programmed to implement a method. In some embodiments, the one or more microcontrollers are individually or collectively programed to implement a method. In some embodiments, the method comprises calculating a value. In some embodiments, calculating the value comprises receiving location data from the one or more sensors. In some embodiments, the location data corresponds with one or more objects entering a space or exiting the space. In some embodiments, calculating the value comprises the location data received. In some embodiments, calculating the value comprises at least one further step. In some embodiments, the at least one further step comprises calculating a number of one or more objects permitted to enter the space. In some embodiments, the at least one further step comprises calculating a wait time. The algorithms and computations described herein may be altered in any acceptable manner so as to achieve their intended purpose.

In some cases, the one or more microcontrollers automatically connect the one or more electronic devices when the one or more electronic devices are located within the predefined area. In some cases, when the one or more electronic devices communicate directly with the one or more microcontrollers, the one or more microcontrollers will prompt a notification to be delivered to the one or more electronic devices in which they are in direct communication. The notification may provide an option for the user of the one or more electronic devices to select that the user is in the predefined area or to select that the user is not in the predefined area. In some embodiments, the one or more microcontrollers will automatically determine whether the user of one or more electronic devices is in the predefined area without the use of a notification.

b. One or More Microcontrollers Used in Calculating a Wait Time

The reporting of wait times to enter a space may provide a person contemplating whether to enter the space with valuable information that may affect their plans. For example, if a person wants to buy something from a store, but they are running late for a prior engagement, the person would like to know if there will be a wait time to enter the store, and if so, how long the wait time will be.

The one or more microcontrollers may be useful in calculating a wait time for entering a space. In some embodiments, the one or more microcontrollers are configured to calculate a wait time to enter a space. In some embodiments, the wait time is an estimated wait time. In some embodiments, the one or more microcontrollers calculate a wait time by determining the number of one or more objects in a predefined area, such as an area outside of a space (a queue for entering the space) or an area inside of the space, by counting a number of wireless communications between the one or more microcontrollers and the one or more electronic devices in the predefined area. Calculating the number of objects in a predefined area may be useful for approximating wait times and/or approximating times at which a predetermined threshold value is met.

In some embodiments, the wait time is calculated based on the location data received by the one or more microcontrollers from the one or more sensors. In some embodiments, the one or more microcontrollers multiply the number of one or more objects in the predefined area by the time in which a second object of one or more objects enters after a first object of one or more objects in order to calculate a wait time. In some embodiments, the calculation performed by the one or more microcontrollers accounts for the position of a first object of one or more objects in the predefined area to calculate a personalized wait time for the first object. Such a calculation will provide for more accurate wait time reporting.

The microcontroller may determine that one or more electronic devices are in a predefined area, such as a queue, through a wireless communication to one or more electronic devices, such as when the one or more microcontrollers acts as an edge device, and/or the use a global positioning system (GPS) position. The one or more microcontrollers may determine that the one or more electronic devices are in the queue to enter the space, rather than in the space. Tracking GPS position data may be useful in differentiating between users who are waiting in the predefined area as compared to users who have already entered the space.

The microcontroller may differentiate between one or more electronic devices in a queue and one or more electronic devices not in the queue by accounting for the proximity of the one or more electronic devices, the ability of the one or more electronic devices to connect to the one or more microcontrollers, and/or by determining that the communication with the one or more electronic devices is located in a predefined area. In some embodiments, the wireless communication between the one or more electronic devices and the one or more microcontrollers occurs within a predefined area. In some embodiments, the predefined area is an area outside of the space. In some embodiments, the predefined area comprises a queue to enter the space.

The one or more microcontrollers may determine that a user of one or more electronic devices is located in a predefined area, such as an area outside of a space (a queue for entry into a space). For example, the one or more microcontrollers may connect through a wireless communication to four (4) electronic devices located in a queue outside of the space. The one or more microcontrollers may use the number of wireless communications, in this case four (4), to calculate a wait time in a queue for entry into a space.

In some embodiments, the one or more microcontrollers may be configured to determine each of the one or more electronic devices' position in the queue. When the position of a first object of one or more objects comprising one or more electronic devices in the queue is determined, the one or more electronic devices may calculate a customized wait time based off of the number of one or more objects ahead of the first object in the queue. The positions in a queue may be useful to a remote user of one or more electronic devices by providing the user with an estimate as to the wait time based off of the current number of one or more electronic devices in the queue to enter the space.

The one or more microcontrollers may use the amount of time between a first entry and a second entry of an object into the space in order to report a wait time. In some embodiments, the wait time is transmitted to the display. In some embodiments, the wait time is transmitted to the server, which may then subsequently be transmitted to one or more electronic devices. In some embodiments, the wait time is transmitted by the one or more microcontrollers to one or more electronic devices.

c. One or More Microcontrollers Calculating a Number of Objects that May Enter a Space The one or more microcontrollers may be useful in calculating a number of objects that may enter a space before a threshold value is reached. The one or more microcontrollers may also be useful in automated capacity counting, which will be useful in accurately and reliably tracking the occupancy of a space. In some embodiments, the one or more microcontrollers are configured to calculate a value. In some embodiments, the value is a number of one or more objects permitted to enter a space. In some embodiments, the number of one or more objects permitted to enter the space is dependent on a threshold value.

A threshold value may be entered into the microcontroller remotely or directly into the housing comprising the microcontroller. In some embodiments, a threshold value transmitted to the one or more microcontrollers. In some embodiments, the threshold value is an occupancy limit. In some embodiments, the occupancy limit is a maximum occupancy limit. In some embodiments, the threshold value is a predetermined threshold value.

The one or more microcontrollers may utilize the location data generated by the one or more sensors. In some embodiments, the one or more microcontrollers counts a number of one or more objects in the space based on the location data received from the one or more sensors.

The one or more microcontrollers may utilize a count in determining the number of objects that may enter a space before a threshold value is reached. In some embodiments, the one or more microcontrollers may increase the count when the location data received from the one or more sensors indicate that an entry of one or more objects are detected. In some embodiments, the count is decreased when the location data received from the one or more sensors indicate that an exit of one or more objects are detected. In some embodiments, the count is subtracted from the threshold value to generate a number of objects that may enter the space before the threshold value is reached. In some cases, the count is subtracted from the threshold value to determine the number of objects that may enter a space before a threshold value is reached. In some embodiments, the count is increased by one when one object of one or more objects enters the space. In some embodiments, the count is decreased by one when one object of one or more objects exits the space.

In an alternative embodiment, the number of objects that may enter a space before a threshold value is reached is calculated comprising a count that is equal to the threshold value. In such cases, the count may be decreased when an entry of an object is detected. In some embodiments, the count may be increased when an exit of an object is detected.

In some embodiments, the number of objects that are permitted to enter the space is transmitted to the display. In some embodiments, the number of objects that are permitted enter the space is transmitted to the server. In some embodiments, the number of objects that are permitted enter the space is transmitted to the one or more electronic devices.

4. Display

Disclosed herein, in some embodiments, are methods, devices, and systems comprising a display. In some embodiments, the housing comprises a display. In some embodiments, the display is located on the housing. A display on a housing that is located at a space may be useful for showing pertinent information, such as a value. For example, the display may be useful for showing an observer a number of entrants that are permitted enter a space before a threshold value is reached.

Figure 8:
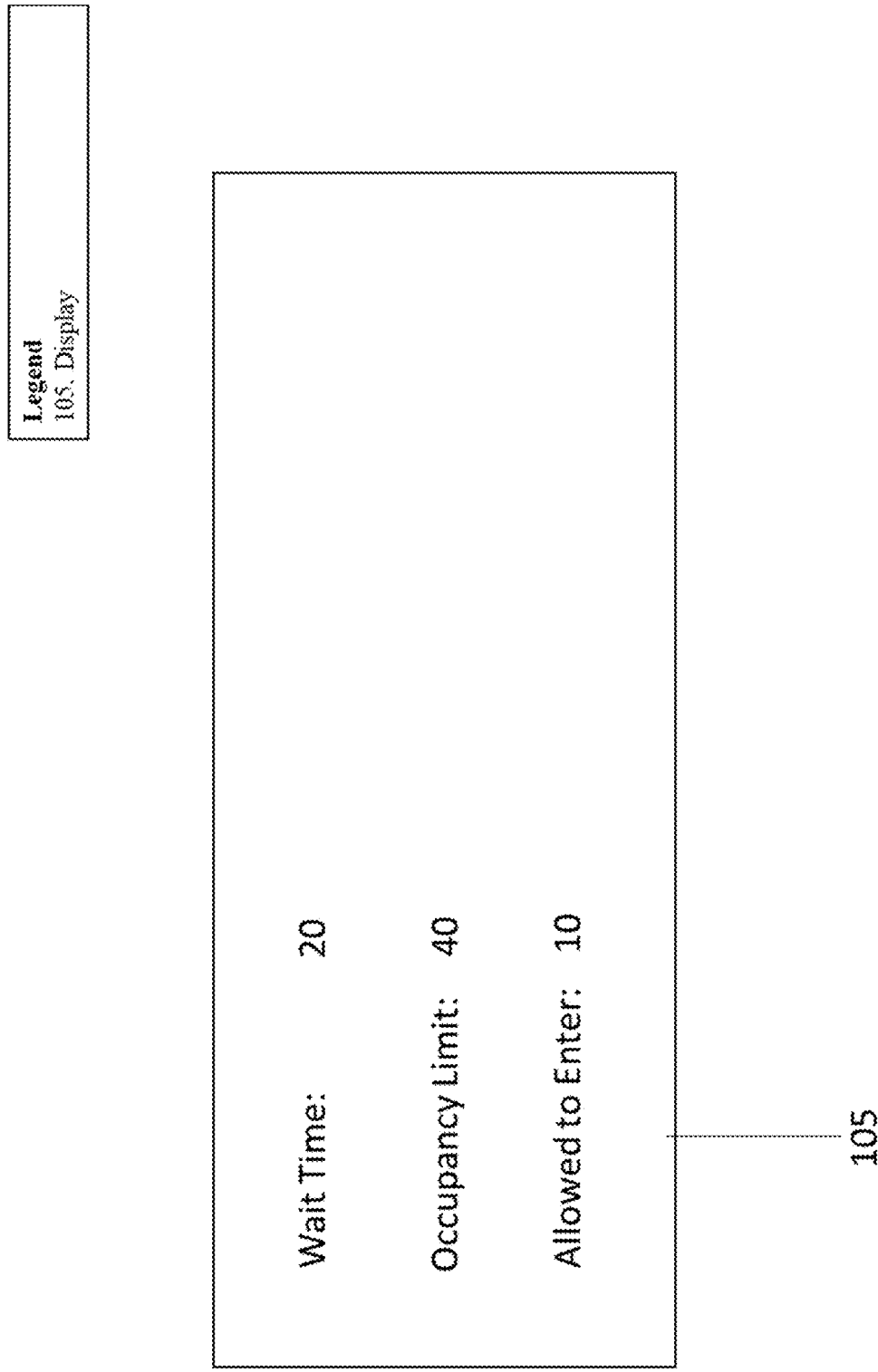
FIG. 8 shows a potential embodiment of the housing display according to an embodiment disclosed herein.

FIG. 8 depicts an embodiment of the data and/or value that may be displayed on the display 105, according to some embodiments disclosed herein. In some embodiments, the display 105 may show a wait time, a predetermined threshold, such as an occupancy limit, and a number of objects that may enter a space before the predetermined threshold is reached. In some embodiments, this data and/or value may also be displayed on the one or more electronic devices. FIG. 8 depicts, according to some embodiments disclosed herein, a situation where a wait time is 20 minutes, an occupancy limit is 40, and a number of objects permitted to enter a space is 10.

Figure 9:
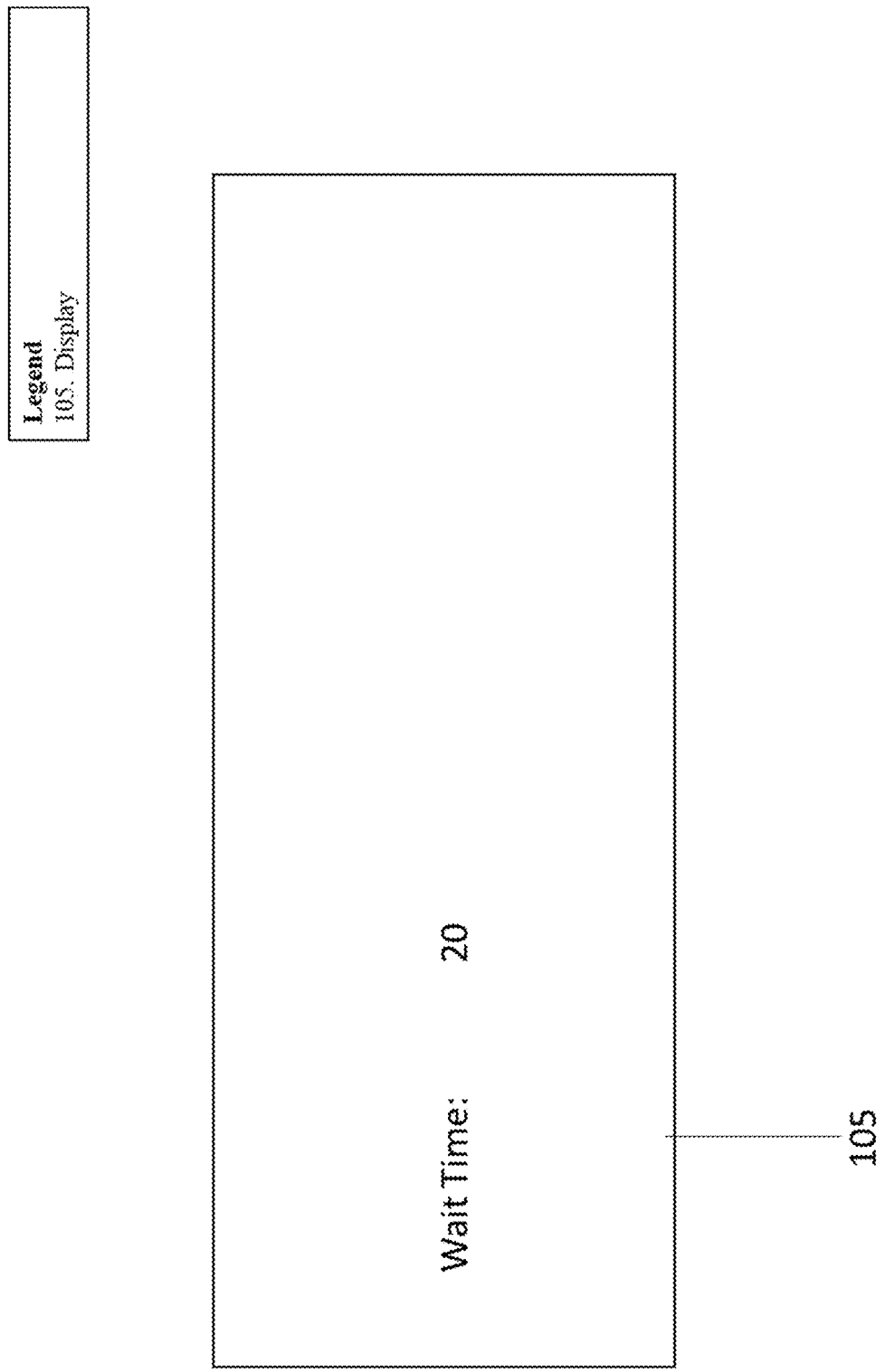
FIG. 9 shows a potential embodiment of the housing display according to an embodiment disclosed herein.

FIG. 9, according to some embodiments disclosed herein, depicts an embodiment of a value that may be displayed on the display 105. In some embodiments, the display 105 may be configured to display a wait time. FIG. 9, according to some embodiments disclosed herein, depicts a situation where a wait time is 20 minutes.

Figure 10:
FIG. 10 shows a potential embodiment of the housing display according to an embodiment disclosed herein.
Figure 10:
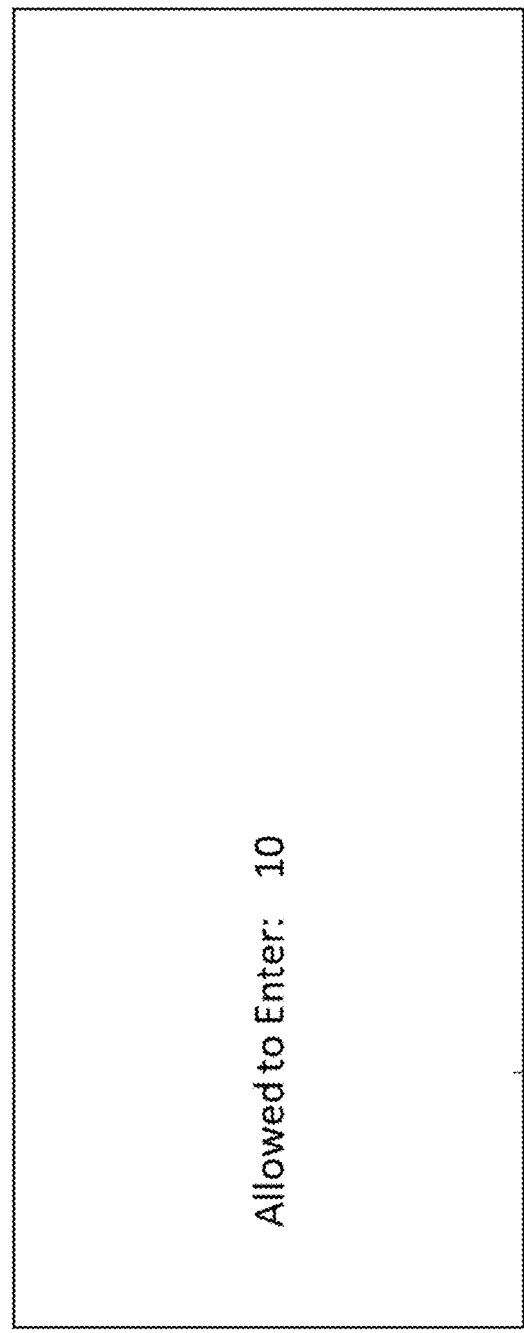

FIG. 10 depicts, according to some embodiments disclosed herein, a value that may be displayed on the display 105. In some embodiments, the display 105 may be configured to display a number of objects permitted to enter. FIG. 10, according to some embodiments disclosed herein, depicts a situation where a number of objects permitted to enter a space before a predetermined threshold is reached is 10.

A display on the housing located at the space may provide numerous benefits over a housing without a display. A housing with a display will allow an observer to view pertinent information while at the space employing the housing. The observer will not be required to possess an electronic device to access such information. Often, people will leave their electronic device (cellular phone) in a different space (such as their car or home) while they decide whether to enter a space. In such a case, the display on the housing will be useful in reporting the pertinent information, such as wait time and/or a number of entrants that are permitted to enter the space before a threshold value is reached and/or the number of people in a queue to enter the space, without the person requiring the use of an electronic device.

Additionally, the reporting of the pertinent value to one or more electronic devices may require the use of an application. A user of one or more electronic devices may not have previously downloaded the application, and thus will not be able to view such pertinent information, if not for the display on the housing. The display will also be useful in situations where users of the one or more electronic devices do not have access to a network, which may occur when cellular devices does not have access to a cellular network. Furthermore, the display on the housing may be useful for quickly reporting a value to an observer, such as an object in a queue. Instead of requiring the object to look up the value on a device other than the housing, which may take time and effort, the object may simply look to the display on the housing at which they are located.

A display comprising the ability to display a value, such as a number, is preferred over an indicator, such as a light, that is not capable of displaying numbers. An indicator consisting of a light may not relay sufficient pertinent information to be useful to an observer. For example, an indicator, such a light, may simply that that a space is occupied; it may not be capable of showing the number of objects that are permitted to enter the space. A display showing numbers may have the ability to change the numbers shown in response to different situations, such as when a wait time changes. Thus, such a display may be capable of providing more detailed information as compared to a display that is not capable of displaying numbers. A display consisting of a light may not be useful in displaying a value, such as a wait-time or a number of objects in a queue.

Furthermore, employees, who may work at a space, are may be encouraged not to use their electronic devices or they may not readily have access to an electronic device while working. Such employees may be required to keep track of the number of objects in a space so as to stay within capacity limits. In such a case, the display on the hardware may be useful in allowing employees to analyze the number of objects that may enter a space before a threshold value is reached. Monitoring capacity limits may play an important role in helping to decrease the transmission of diseases, such as COVID-19, and to help ensure that there are adequate safety measures in the case of an emergency.

In some embodiments, the display comprises one display. In some embodiments, the display comprises one or more displays. In some embodiments, the display comprises one, two, three, four, five or six displays. In some embodiments, the housing does not comprise a display. In some embodiments, the display is located in the predefined area. In some embodiments, the display is located at the border of the predefined area. In some embodiments, the display is located above the portal.

In some embodiments, the display is a liquid-crystal display (LCD). In some embodiments, the display is a light-emitting diode (LED). In some embodiments, the display is an electroluminescent display. In some embodiments, the display comprises one type of display. In some embodiments, the display comprises one or more types of displays. In some embodiments, the display comprises two types of displays, such as an LCD and an LED. In some embodiments, the display comprises a light.

In some embodiments, the display is configured to display a value. The display may be configured to show a value transmitted to or received by the display. In some embodiments, the display is in communication with the one or more microcontrollers. In some embodiments, the display receives a value from the one or more microcontrollers. In some embodiments, the display is in communication with the server. In some embodiments, the display receives a value from the server. In some embodiments, the display is configured to show a wait-time. In some embodiments, the display is configured to show a number of objects that are permitted to enter a space before a threshold value is reached. In some embodiments, the display is configured to display a threshold value. In some embodiments, the display is configured to display the number of objects in a queue. In some embodiments, the display is configured to display a wait-time and a number of objects that may enter a space before a threshold value is reached. In some embodiments, the display is configured to display any one or more of the following: a wait-time, a threshold value, a number of objects that may enter a space before a threshold value is reached, and a number of objects in a queue. In some embodiments, the display is configured to display an a value received from an output interface.

The value may be any one or more of the values disclosed herein. In some embodiments, the value comprises a color. In some embodiments, the display will show the color red when a wait time is above a first threshold value, such as number of minutes which may be transmitted to the one or more microcontrollers. In some embodiments, the display will show the color red when the number of objects within a space is at the predetermined threshold value. In some embodiments, the display will show the color yellow when a wait time is at a second predetermined threshold value, such as a number of minutes that is below the predetermined threshold value. In some cases, the display will show the color yellow when the number of objects within a space is at a second predetermined threshold. In some embodiments, the second predetermined threshold is less than the predetermined threshold. In some embodiments, the second predetermined threshold is one, two, three, four, five, six, seven, eight, nine, or ten. In some embodiments, the display will show the color green when the number a wait time is below the second predetermined threshold value. In some embodiments, the display will show the color green when the number of objects within a space is below the second predetermined threshold value.

In some embodiments, when a predetermined threshold value has been reached, the display will show "DO NOT ENTER" or similar text. In some embodiments, the display will display a value comprising a wait time with text indicating that such value comprises a wait time by displaying "Wait time" or similar text, before or after the displayed wait time value. In some embodiments, the display will show a value comprising a number of objects permitted to enter a space with text indicating that such value comprises the number of objects permitted to enter the space by displaying "Can Enter" or similar text, before or after the value comprising the number of objects permitted to enter the space. In some embodiments, the display will show a value comprising a predetermined threshold value, such as a maximum occupancy, with text indicating that such value comprises a predetermined threshold by displaying "Maximum occupancy", "Capacity limit", or similar text, before or after the predetermined threshold. In some embodiments, the display will display a value comprising a wait time, such as a wait time in traffic or a time until an entry or exit onto the roadway is reached. In such cases, the display may show "Time until exit", "time in traffic", language indicating a time until a specific point, such as an entry way for a highway, or other similar language before or after the value displayed.

5. Additional System Components

Disclosed herein, in some embodiments, are systems comprising the devices disclosed herein and additional system components that enable the real-time monitoring of a capacity and/or wait time for entering a space disclosed herein. In some embodiments, the additional system components comprise a server, a database, one or more electronic devices, and/or an output interface. In some embodiments, the one or more electronic devices are in wireless combination with the server and comprise an application (e.g., web-based or mobile) that is configured to display to the user pertinent information, including a value disclosed herein. In some embodiments, the pertinent information is displayed using a graphical user interface (GUI) disclosed herein. In some embodiments, the output interface (which, in some embodiments, is separate from the personal electronic device) may be used to enter pertinent information, such as for example, to override the values calculated by the device disclosed herein.

a. Server

Disclosed herein, in some embodiments, are methods, devices, and systems comprising a server. In some embodiments, the server disclosed herein is computer hardware or software that provides functionality for other programs or devices. The server may be capable of storing data, such as the value transmitted in a signal from the microcontroller, the output interface or the one or more electric devices. The server may be useful as an intermediary, such as in the communication between the one or more microcontrollers and the one or more electronic devices. The server may also be capable of delivering the data in real-time to the one or more electric devices, the one or more microcontrollers, and/or the output interface. The delivery of the data to the one or more electronic devices may occur when a user of the one or more electronic devices selects a space employing the use of the housing on an application.

In some embodiments, the server is a remote server. In some embodiments, the server comprises a cloud server. In some embodiments, the server stores a value transmitted by the one or more microcontrollers. In some embodiments, the server transmits a signal, comprising a value. In some embodiments, the server transmits a real-time value. In some embodiments, the server transmits a signal to one or more electronic devices. In some embodiments, the server transmits a signal, such as a value, to one or more electronic devices when a user of the one or more electronic devices selects a space on the one or more electronic devices and the one or more electronic devices requests the value. In some embodiments, the server transmits a signal to the one or more electronic devices when the user using an application on the one or more electronic devices requests a value. In some embodiments, the server transmits a signal to an output interface. In some embodiments, the server transmits a signal to one or more microcontrollers. In some embodiments, the server receives a signal from the one or more microcontrollers. In some embodiments, the server receives a signal from the output interface. In some embodiments, the server receives a signal from the one or more electronic devices. In some embodiments, the server receives a signal from an application when a user of the one or more electric devices selects a space.

In some embodiments, the server is an edge server. An edge server is a server located at the network edge and is used to reduce latency. An advantage of an edge server is that content may be stored as close as possible to the requesting one or more electronic devices.

b. One or More Electronic Devices

Disclosed herein, in some embodiments, are methods, devices, and systems comprising one or more electronic devices. One or more electronic devices may be useful in displaying a value, such as a wait time, pertaining to a space employing the housing. The one or more electronic devices may comprise any suitable means for displaying information, such as an application or graphical user interface. In some embodiments, the one or more electronic devices comprises one or more personal electronic devices. In some cases, the one or more personal electronic devices may be any one or more of a cellular phone, a computer, such as a laptop, a television screen, a tablet, or a desktop computer. In some embodiments, the one or more electronic devices comprises a screen integrated into a vehicle. In some embodiments, the one or more electronic devices comprises an outdoor screen for displaying information. In some embodiments, the one or more electronic devices are integrated into manufacturing equipment.

In some embodiments, the one or more electronic devices displays a value. In some embodiments, the one or more electronic devices displays a value from the past, such as a previous day's value or an average of past values. In some embodiments, the one or more electronic devices displays a predictive value based on parameters such as time and date. In some cases, the one or more electronic devices displays a trend in a value based off of one or more values gathered in one or more previous days. In some embodiments, the one or more electronic devices displays an option for the user of the one or more electronic devices to select that the user is in queue at a space. In some embodiments, the one or more electronic devices displays an option for the user of the one or more electronic devices to select a space.

In some embodiments, the one or more electronic devices comprises an application. The application may be used access any of the values disclosed herein. The user of the one or more electronic devices may open the application on the one or more electronic devices and select a space employing the housing in order to view the data and/or a value, such as a calculated value. The pertinent information, such as a value, may be delivered to the one or more electronic devices from the server (cloud server) and/or the one or more microcontrollers and the user of the one or more electronic devices may view the pertinent information from the selected space.

In some embodiments, the one or more electronic devices requests information in response to an input from a user. In some embodiments, the request is transmitted to the server. In some embodiments, the request is transmitted to the one or more microcontrollers.

c. Application

Disclosed herein, in some embodiments, are methods, devices, and systems comprising one or more electronic devices comprising an application. In some embodiments, the application comprises a mobile application. In some embodiments, the application comprises a web application. In some embodiments, the application comprises a mobile application and a web application.

1) Web Application

In some embodiments, the computer system comprises software for a web application. In some embodiments, a web application may utilize one or more software frameworks and one or more database systems. A web application, for example, is created upon a software framework such as Microsoft® .NET or Ruby on Rails (RoR). A web application, in some instances, utilizes one or more database systems including, by way of non-limiting examples, relational, non-relational, feature oriented, associative, and XML database systems. Suitable relational database systems include, by way of non-limiting examples, Microsoft® SQL Server, mySQL™, and Oracle®. Those of skill in the art will also recognize that a web application may be written in one or more versions of one or more languages. In some embodiments, a web application is written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). A web application may integrate enterprise server products such as IBM® Lotus Domino®. A web application may include a media player element. A media player element may utilize one or more of many suitable multimedia technologies including, by way of non-limiting examples, Adobe® Flash®, HTML 5, Apple® QuickTime®, Microsoft® Silverlight®, Java™, and Unity®.

In some embodiments, the web application comprises a web browser plug-in to add specific functionality. Makers of software applications may support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. The toolbar may comprise one or more web browser extensions, add-ins, or add-ons. The toolbar may comprise one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™ PHP, Python™, and VB .NET, or combinations thereof.

In some embodiments, Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. The web browser, in some instances, is a mobile web browser. Mobile web browsers (also called microbrowsers, mini-browsers, and wireless browsers) may be designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

2) Mobile Application

In some embodiments, the application is a mobile application. The mobile application may be provided to a mobile digital processing device at the time it is manufactured. The mobile application may be provided to a mobile digital processing device via the computer network described herein.

A mobile application is created by techniques known to those of skill in the art using hardware, languages, and development environments known to the art. Those of skill in the art will recognize that mobile applications may be written in several languages. Suitable programming languages include, by way of non-limiting examples, C, C++, C#, Featureive-C, Java™, Javascript, Pascal, Feature Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments may be available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Suitable commercial forums that make mobile applications available for distribution include, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Whether a mobile or web-based application, the application of the present disclosure may be accessed through the one or more electronic devices when the user is located at a space employing the housing or at a location remote from a space employing a housing. Additionally, the application may be accessed through the one or more electronic devices when the user is located outside a space, such as at a remote location. The application may be configured in any acceptable manner for displaying information and may be on any acceptable platform or acceptable device, such as a personal electronic device. In some embodiments, the software system comprises an application. In some embodiments, the application is configured to display any of the values disclosed herein. In some embodiments, the application may display a wait time (e.g., an estimated wait time). In some embodiments, the application may display a number of objects permitted to enter a location. In some embodiments, the application may display an occupancy limit, such as a maximum occupancy. In some embodiments, the application may display a wait time and a number of objects permitted to enter a location. In some embodiments, the application may display a wait time, a number of objects permitted to enter a location, and an occupancy limit. In some embodiments, the application will display an occupancy rate.

The user of the one or more electronic devices may select a space at which the housing is located in order to view the pertinent information, such as a value, regarding the space in which the user plans on going. The one or more electronic devices may also be used by a user who is waiting in the queue to enter a space in which the housing is employed. The user may utilize one or more electronic devices to indicate that the user is in a queue at a space selected on the one or more electronic devices, which may help increase the accuracy of a wait time or the number of objects in a queue. In some embodiments, the application prompts the one or more electronic devices to transmit the user's location. In some embodiments, the application displays a value from one or more spaces near the user.

In some cases, the application automatically transmits information, such as the one or more electronic devices' position, to the server and/or the one or more microcontrollers. In some embodiments, the automatically transmitted information comprises location data. In some cases, the application is configured to receive an input from a user. In some embodiments, the input is location selected on the application that employs the housing. In some embodiments, the input is a selection that the user is in the predefined area. In some embodiments, the input is a selection that the user is not in the predefined area. In some embodiments, the input is a selection that the user is within the space. In some embodiments, the input is a selection that the user is not within the space. In some embodiments, the input is a selection of the user's position in a queue to enter the space. In some embodiments, the application requests the value pertaining to a selected space when a user selects the location on the application. In some embodiments, the one or more electronic devices generates a request in response to the input into the application. In some embodiments, when a value is received from the server, the one or more electronic devices displays the value on the application. In some embodiments, when a value is received from the one or more microcontrollers, the one or more electronic devices displays the value on the application.

The user of the application may select the application from one more electronic devices. Once selected, the application will open to a home screen. The home screen may display a map, from which the user may select a space for which a value to be viewed is desired, and/or a search bar, for which the user may type in a name of the space. After a user has selected a space for which to view a value, the user may select a home or menu option, which may return the user to the original home screen. If desired, the user may then repeat the process.

The application may be configured to alert the user of the one or more electronic devices. In some embodiments, the application pushes a notification to a display of one or more electronic devices. In some embodiments, the push notification corresponds with a value, such as a user inputted predetermined threshold value. The inputted predetermined threshold value may be a number chosen by the user and may represent an amount of a wait time to enter a space or a number of one or more objects that are permitted to enter a space. For example, the user of the application may request that the application sends the push notification when the number of one or more objects that may enter the space is two. If the current number of one or more objects that may enter the space is below two, such as zero, a push notification will not be sent until the number of one or more objects that may enter the space is two or greater than two. As yet another example, a user may select to receive a push notification for an estimated wait time. The user may select a specified estimated wait time that once reached or below the specified estimated wait time, will prompt a push notification to be automatically displayed by the application.

The push notification be displayed by the application when a value for a roadway is reached, such as the wait time for reaching a second position on a roadway from a first position on a roadway. A push notification may be displayed by the application when a time in which it takes for two vehicles to pass under the one or more sensors reaches a specified time chosen by the user on the application.

In some embodiments, the one or more electronic devices allows the user to select a space and input that the user is in a predefined area, such as a queue to enter the space or within the space. In some cases, the user of the one or more electronic devices may select that the user is in a queue to enter the space. In some cases, the user of the one or more electronic devices may select that the user is inside the space.

The application may be configured for use on a phone, laptop, desktop computer, tablet, car, or other similar device. The application may be configured to be compatible with a specific electronic device or a variety of electronic devices. The application may be downloaded from any appropriate location, such as an iOS application store or an android store.

d. Software Modules

In some embodiments, the systems described herein comprise one or more software modules that contain instructions for performing the methods described herein. In some embodiments, the one or more microcontrollers described herein either alone, or collectively, are configured to perform such instructions contained in the software modules. In some embodiments, a software module comprises a file, a section of code, a programming feature, a programming structure, or combinations thereof. A software module may comprise a plurality of files, a plurality of sections of code, a plurality of programming features, a plurality of programming structures, or combinations thereof. By way of non-limiting examples, the one or more software modules are implemented by a web application, a mobile application, and/or a standalone application. Software modules may be in one or more computer programs or application. Software modules may be hosted on more than one machine. Software modules may be hosted on cloud computing platforms. Software modules may be hosted on one or more machines in one location. Software modules may be hosted on one or more machines in more than one location.

e. Databases

In some embodiments, the systems described here comprise one or more databases suitable for storage and retrieval of geologic profile, operator activities, division of interest, and/or contact information of royalty owners. Suitable databases include, by way of non-limiting examples, relational databases, non-relational databases, feature oriented databases, feature databases, entity-relationship model databases, associative databases, and XML databases. In some embodiments, a database is internet-based. In some embodiments, a database is web-based. In some embodiments, a database is cloud computing-based. A database may be based on one or more local computer storage devices.

f. Wireless Communication by the Electronic Devices

The one or more electronic devices may communicate with the one or more microcontrollers, such as when the microcontroller comprises an edge device. In some cases, the communication is a wireless communication. In some embodiments, the one or more electronic devices is in communication with a server. In some embodiments, the one or more electronic devices is in communication with a cloud server. In some embodiments, the one or more electronic devices is in communication with one or more microcontrollers.

In some cases, the communication is a short-range communication. In some embodiments, the one or more microcontrollers is in short-range communication with the one or more electronic devices. In some embodiments, the one or more microcontrollers is in short-range communication with the one or more personal electronic devices. In some cases, the one or more personal electronic devices is in wireless communication with the one or more microcontrollers and/or the server through a wi-fi connection.

In some embodiments, the communication is a direct wireless communication. In some embodiments, the communication is an indirect wireless communication, such as when an intermediary is utilized. The one or more electronic devices may allow a communication with the one or more microcontrollers at the discretion of the user. In such a case, the user of the one or more electronic devices may be given an option by an application to allow such a communication or to deny the communication. Alternatively, the one or more electronic devices may automatically communicate with the one or more microcontrollers when such a communication is established.

In some embodiments, a direct communication between the one or more microcontrollers and the one or more electronic devices is established. In some embodiments, when the direct communication between the one or more microcontrollers and the one or more electronic devices is established, the user of the one or more electronic devices may input that the user is in a queue for entering a location for a space employing the housing. In such a case, the one or more electronic devices is in wireless communication with the one or more microcontrollers. In some embodiments, the one or more microcontrollers automatically connects to the one or more electronic devices when the one or more electronic devices is within a predefined area. In some embodiments, a user of the one or more electronic devices may select on the one or more electronic devices that the user is not in a queue at waiting to enter a space employing the housing.

g. Graphical User Interface

Disclosed herein, in some embodiments, are methods, devices, and systems comprising a graphical user interface. In some embodiments, a graphical user interface (GUI) is engineered to be employed on one or more electronic devices. In some embodiments, a user of one or more electronic devices may access a value through a GUI. In some embodiments, a user of one or more electronic devices in a predefined area may access a value through a GUI. In some embodiments, a user of one or more electronic devices outside of the predefined area may access a value through a GUI. In some embodiments, a user of one or more electronic devices outside of the space may access a value through a GUI. In some embodiments, a user of one or more electronic devices inside of the space may access a value through a GUI. In some embodiments, the GUI provides the same capabilities as the application disclosed herein. In some embodiments, the GUI is engineered to accomplish the same tasks as the application disclosed herein.

In some embodiments, the GUI configured to respond to touch or haptic input from the user to enter information (e.g., pertinent information) or request a value calculated by the system for a space from the systems disclosed herein. In some embodiments, the GUI is operatively connected to a keypad or block that enables the user to enter the information or request the value from the system. In some embodiments, the GUI is configured to respond to a gesture by the user that may not involve touching the display or output interface for the GUI disclosed herein. Non-limiting examples of gesture include a motion of the user's hand (e.g., up, down, circular, and the like) relative to a fixed referenced position, which may be sensed by an internal sensor of the system. Non-limiting examples of electronic devices having such GUI can be found in U.S. Pat. No. 10,037,138, which is hereby incorporated by reference in its entirety. In some embodiments, the GUI is configured to permit the user to switch from an application (e.g., web application, mobile application) for the object requesting the value for the space (e.g., a human subject waiting in line at the grocery store), and a user managing the space (e.g., grocery store manager) inputting the pertinent information.

h. Output Interface

Disclosed herein, in some embodiments, are methods, devices, and systems comprising an output interface. An output interface may be used to input limitations pertaining to the space, such as an occupancy limit. Additionally, the output interface may be used to monitor values calculated by the one or more microcontrollers, override the values calculated by the one or more microcontrollers, or to monitor information pertaining to the space, such as a value. Furthermore, the output interface may be useful in monitoring information pertaining to the one or more electronic devices in the predefined, in the space, or at a location remote from the space. An output interface may be useful in adhering to laws imposed by the states and/or the federal government, and/or adhering to court orders. The output interface may be used to adjust values, such as occupancy limits, in order to help ensure that an occupancy within a space is within the desired boundaries. The output interface may be used to adjust occupancy limits according to preference and/or state, local or federal mandates or laws. In many cases, an output interface will be useful in adjusting occupancy limits put in place in order to protect the public against a disease, such as a virus.

In some cases, the output interface is located on a surface of the housing. In some cases, the output interface is located within the housing. In some cases, the output interface is located remotely from the housing. In some cases, the output interface is located on one or more electronic devices. In some embodiments, the output interface is located on one or more electronic devices designated to run the output interface. In some cases, the output interface is wirelessly connected to the housing, such as through an application. In some cases, the output interface is wired to the housing.

In some embodiments, the output interface is displayed on a graphic user interface. In some embodiments, the output interface is displayed on an application. In some embodiments, the output interface is displayed on an application designated for the space. For example, the application designated for the space may comprise a mobile application through which an employee or owner of the space may input a value or other information. An application designated for the space may comprise different capabilities as compared to an application used by the one or more objects. For example, the application designated for the space may allow a value input into the application designated for the space to override the value calculated by the one or more microcontrollers.

An output interface may be helpful in monitoring a value of a space. In some embodiments, the one or more microcontrollers will transmit a notification to the output interface when a predetermined value, such as an occupancy limit, is exceeded. In such a case, the user of the output interface may take appropriate actions to ensure that the values are returned to acceptable parameters. In some embodiments, the output interface receives a value input by a user. In some embodiments, the value received by the output interface overrides the value calculated by the one or more microcontrollers. In some embodiments, the value received by the output interface is shown on the display. In some embodiments, the value received by the output interface is transmitted to the server. In some embodiments, the value received by the output interface is transmitted from the server to the one or more electronic devices. In some embodiments, the value received by the output interface is displayed on the application.

Additionally, the output interface may provide a useful mechanism for monitoring the security of a space. When a space is intended to be unoccupied by the owner or an employee of the space, the housing may be set to a security mode. When the housing is set to a security mode, upon the entry of an object into the space the one or more microcontrollers may send a notification to the output interface to indicate that an entry has been detected. In some embodiments, the housing comprises a security mode. In some embodiments, when the security mode is enabled, the one or more microcontrollers transmits a notification when the one or more sensors detects one or more objects entering or exiting the space. In some embodiments, the one or more microcontrollers transmits the notification to the server. In some embodiments, the server transmits the notification to the output interface. In some embodiments, the one or more microcontrollers transmits the notification to the output interface. In some embodiments, the one or more microcontrollers transmits the notification to emergency authorities, such as the police.

In some embodiments, the output interface is on an output application. The output application may be similar or the same as the application disclosed herein. In some embodiments, the output application comprises a text box. In some embodiments, the text box is engineered to receive a value. In some embodiments, the text box is engineered to receive a predetermined threshold value. In some embodiments, the text box comprises the predetermined threshold value. In some cases, the text box is engineered to alter a displayed value. In some cases, the displayed value is altered by adding or subtracting from the value.

i. Space

The methods, devices, and systems disclosed herein may be useful for monitoring a value pertaining to a space. The space may be any acceptable space of any size or other parameter. In some cases, the space comprises an indoor space. In some cases, the space comprises an outdoor space. In some cases, the space comprises both an indoor and outdoor space. In some cases, the space comprises a building. In some cases, the building comprises a store. In some cases, the building comprises a restaurant. In some cases, the building comprises a bar. In some cases, the building comprises a venue, such as a concert hall. In some cases, the building comprises an office. In some cases, the building comprises an apartment. In some cases, the space comprises a house. In some cases, the space comprises a theater, such as a movie theater. In some cases, the space comprises a lecture hall. In some cases, the space comprises a classroom. In some cases, the space comprises a gymnasium. In some cases, the space comprises a library. In some cases, the space is a museum. In some cases, the space is an art gallery. In some cases, the space comprises a restroom. In some cases, the space comprises a fitness center. In some cases, the space is a storage or transportation container. In some cases, the space is a parking garage. In some cases, the space is a bridge. In some cases, the space is an aircraft. In some cases, the space is a form of public transportation. In some cases, the form of public transportation is a subway. In some cases, the form of public transportation is a bus. In some cases, the space is a park. In some cases, the space is a sports venue. In some cases, the space is a roadway. In some cases, the roadway is a street. In some cases, the roadway is a highway. In some cases, the space is a parking lot. In some cases, the space comprises an indoor space and an outdoor space, such as a venue comprising an outdoor field and an indoor concert hall. In some cases, the space is a park. In some cases, the space is an amusement park. In some embodiments, the space is a waterpark.

j. Portal

Disclosed herein, in some embodiments, are methods, devices, and systems comprising that may be useful in determining a value relating to objects passing through a portal into a space. In some cases, the portal is an opening that will allow an object to enter and/or exit a location. In some cases, the portal may be an entry way, such as a door, a gate, or any other acceptable means of entering and/or exiting a space. In some cases, the portal comprises an overpass. In some cases, the portal is a bridge. In some cases, the portal comprises an entry point for a roadway, such as a highway. In some cases, the portal is scaffolding above and/or next to the roadway. In some cases, the portal comprises a scaffolding on a roadway. In some cases, the portal comprises a cartridge, such as a cartridge for counting cells. In some cases, the portal comprises an opening in a machine. In some cases, the portal is an opening that will allow a person to enter an amusement park ride.

Additionally, the portal may be an entrance and/or an exit to a garage. In some cases, the portal is a point on a roadway. In some cases, the portal is an entrance to a space. In some cases, the portal is an exit from a space.

k. Value

Disclosed herein, in some embodiments, are methods, devices, and systems that may be useful in determining a value related to a space. The system, methods, and devices disclosed herein may be useful for displaying and monitoring a value. In some embodiments, the value comprises a wait time. In some embodiments, the wait time comprises an estimated wait time. In some embodiments, the value comprises a number of objects permitted to enter a space. In some embodiments, the value comprises a number of people permitted to enter a space. In some embodiments, the value comprises a number of cars permitted to enter a space. In some embodiments, the value comprises an occupancy limit. In cases, the occupancy limit comprises a maximum occupancy limit. In some embodiments, value is a real-time value. In some embodiments, the value is a predictive value. In some embodiments, the value on the display is a real-time value. In some embodiments, the value on the one or more electronic devices is a real-time value. In some embodiments, the value on the output interface is a real-time value.

An occupancy rate may be calculated by dividing the number of one or more objects in the space by the threshold value and multiplying the dividend by 100%. In some embodiments, if the one or more sensors detect an entry into the space, the number of one or more objects in the space will be incremented by the one or more microcontrollers. In some embodiments, when the one or more sensors detect an exit from the space, the number of one or more objects in the space will be decremented by the one or more microcontrollers. After the detection of an entry into the space or exit from the space, the subsequent occupancy rate will be calculated as NUMBER OF PEOPLE/MAXIMUM CAPACITY. In some cases, the occupancy rate is multiplied by 100%. In some embodiments, the occupancy rate comprises a percentage of the occupancy limit at which the space is currently occupied. In some embodiments, the value comprises a percentage of the occupancy limit at which one or more objects is permitted to enter. The occupancy rate at which one or more objects is permitted to enter may be calculated by dividing the number of one or more objects in the space by the threshold value, multiplying the dividend by 100% and then subtracting the resulting percentage from 100%. For example, the occupancy rate may indicate that a space is 75% occupied, or the value may indicate that a space has 75% of its occupation limit open for occupation, and thus 25% of the occupancy limit is available.

In some cases, the one or more microcontrollers calculate the value. In some cases, the server calculates the value. In some cases, an output interface inputs the value.

In some embodiments, the value is a security alert. In some embodiments, the security alert is transmitted from the microcontroller to the server, one or more electronic devices, and/or an output interface when the sensors detect one or more objects outside of normal or adjusted business hours or when the housing is set to a security mode.

In some embodiments, the value is a set of normal or adjusted hours. In some embodiments, the value is a set of hours indicative of the normal business hours of a space. In some embodiments, the value is a set of hours of adjusted business hours of a space.

In some embodiments, the value is representative of the number of vehicles that are permitted to enter a space, such as a parking garage. In some embodiments, the value is representative of the number of vehicles permitted to cross a bridge.

In some embodiments, the value is representative of the number of inanimate objects that are permitted to enter a space. Counting the number of inanimate objects permitted to enter a space may be useful for the packaging and/or shipping of goods, such as food items and medications, which may enter a space after being placed on a conveyor belt or similar means of transportation. In some embodiments, the value is representative of a number of cells permitted to enter a space.

In some embodiments, the value is representative of a number of one or more objects that have passed by the one or more sensors in one direction. In some embodiments, the value is representative of a number of objects that have entered the space. In some embodiments, the value is representative of a number of one or more objects that have exited the space. In some embodiments, the value is representative of the difference between one or more objects that have entered the space and one or more objects that have exited the space.

Any acceptable terminology intended to describe the value may be provided before or after the displayed value, such as when the value is shown on the display, the one or more electronic devices, the application or the output interface.

l. One or More Objects

Disclosed herein, in some embodiments, are methods, devices, and systems comprising detecting one or more objects. The one or more objects may be any appropriate object for detecting. In some embodiments, the object is an animal. In some embodiments, the object is livestock. In some embodiments, the animal is a primate. In some embodiments, the one or more objects comprises a human. In some embodiments, the one or more objects comprises a cell, such as a human cell. A detectable cell may be an abnormal cell, such as a cell comprising cancer biomarkers. In some embodiments, the one or more objects comprises a normal cell. In some embodiments, the one or more objects comprises an inanimate object. In some embodiments, the inanimate object comprises a vehicle. In some embodiments, the inanimate object comprises a good. In some embodiments, the one or more objects comprise an item on a conveyor belt. In some embodiments, the one or more objects comprise a food item. In some embodiments, the one or more objects comprise a medication in a dosage form, such as a tablet, capsule or caplet. In some embodiments, the one or more objects enter a space. In some embodiments, the one or more objects exit a space. In some embodiments, the one or more objects comprises an intruder, who is not authorized to access the space at a given time.

m. Security

The devices, methods, and systems disclosed herein, in addition to calculating and/or displaying values, may be useful in ensuring the security of a space. For example, when a space is outside of normal business hours, the housing may be set to a security mode. While in security mode, if the one or more sensors detect one or more objects entering or exiting a space, a value comprising an alert may be transmitted to an output interface and/or the local authorities. In some embodiments, the housing the system comprises a security mode.

The security mode may be set to engage at a predetermined time, such as outside of a business hours. The security mode may be manually set, such as through an output interface. In some embodiments, when the housing is set to security mode, the one or more microcontrollers transmits an alert to the server. In some embodiments, when the housing is set to security mode, the one or more microcontrollers transmits an alert to the display. In some embodiments, when the housing is set to security mode, the one or more microcontrollers transmits an alert to the one or more electronic devices. In some embodiments, when the housing is set to security mode, the one or more microcontrollers transmits an alert to the output interface. In some embodiments, when the housing is set to security mode, the one or more microcontrollers transmits an alert to the authorities. Applicable authorities may include a police department and/or a fire department.

II. METHODS

Provided herein are methods of using the systems and devices disclosed herein. The values may represent, but are not limited to representing, a wait time and a number of objects that may enter a space before a threshold value is reached.

Figure 3:
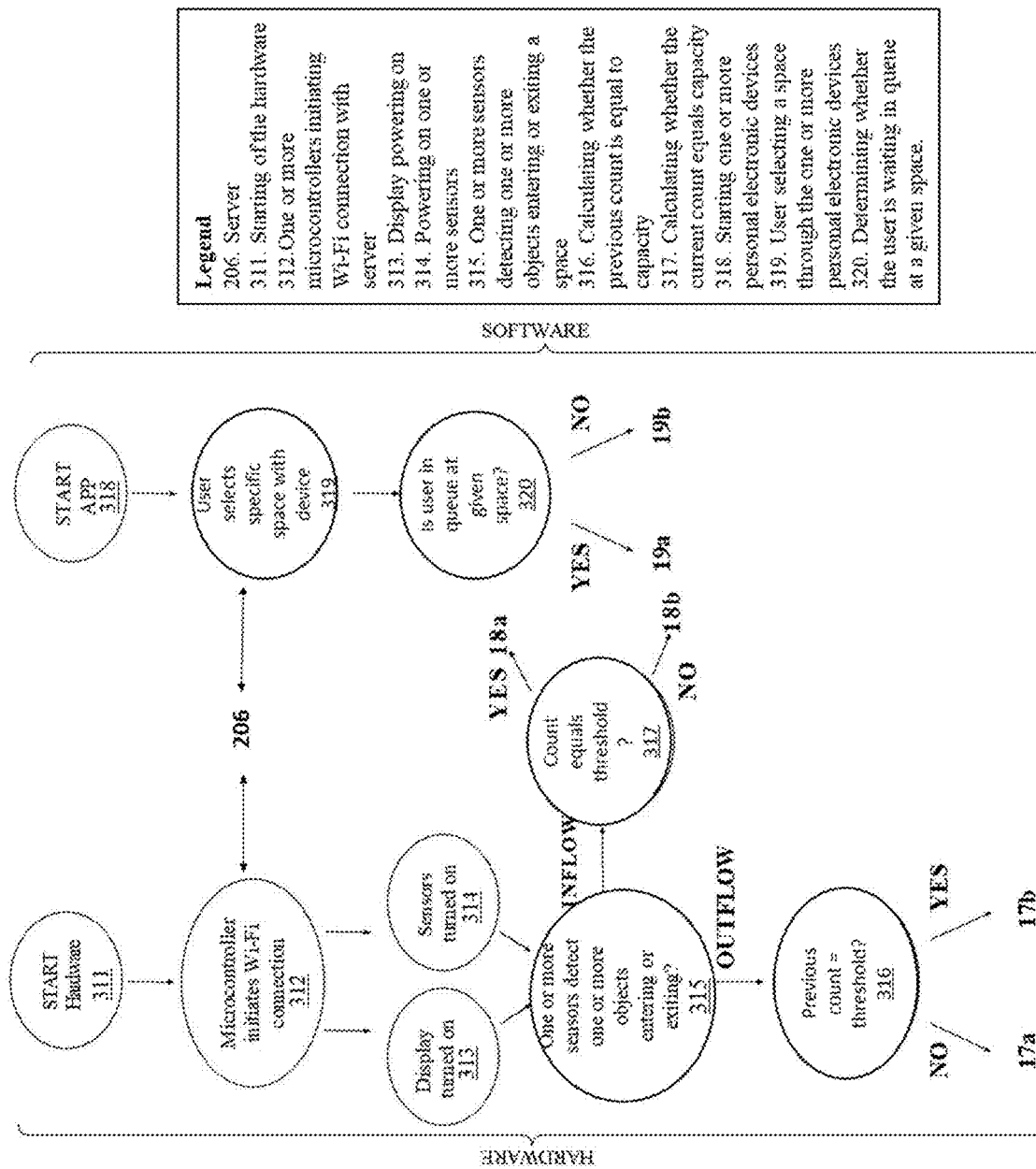
FIG. 3 shows a diagram of one embodiment of the hardware and software functions according to an embodiment disclosed herein.

Disclosed herein, in some embodiments, are methods utilizing the devices and systems disclosed herein to calculate the estimated wait time to enter a space. FIG. 3 depicts one embodiments of a flowchart demonstrating the interplay of the hardware and software (the one or more electronic devices). In some embodiments, the activity of this integrated system allows for the transmission of real time data regarding wait times and occupancy rates.

In some embodiments, through one or more electronic devices, users of the one or more electronic devices may select any space that employs the hardware housing of the present disclosure to view the data collected and delivered to the cloud. In some embodiments, the one or more electronic devices may allow users of the one or more electronic devices to view data as well as interact with its software to choose a specified space and therefore the hardware from which to view data from. In some embodiments, the one or more electronic devices may employ the use of an application to complete this task. In some embodiments, the one or more electronic devices 208 may be built to be compatible with specific or various electronic devices.

In some embodiments, the hardware starts 311 when the hardware is turned on. In some embodiments, the one or more microcontrollers initiate a wi-fi connection 312, the display is turned on 313, and the one or more sensors are turned on 314. In some embodiments, the one or more sensors can detect either the inflow (entering) or outflow (exiting) of person(s) 315. In some embodiments, if an inflow is detected, the one or more microcontrollers 207 will increment a count of the number of persons in the space, and the subsequent occupancy. For example, if one person enters the area, the count will be increased by one. In some embodiments, the one or more microcontrollers will increase the count to reflect the number objects within a space with the recent entrant. In some embodiments, the count may be subtracted from a predetermined threshold value, such as a maximum occupancy, of a space in order to determine the number of objects, such as people, that may enter the space before the predetermined threshold value is reached. In some embodiments, when an inflow of one or more objects is detected, the one or more microcontrollers will determine whether the count equals the predetermined threshold value 317. In some embodiments, if the given space has reached the threshold value, the display and/or the one or more electronic devices may show that "0" objects are allowed to enter 18a. In some embodiments, if the maximum occupancy has been reached, the microcontroller will begin timing the length of time the space remains at maximum capacity, which may be useful in calculating a wait time. In some embodiments, if the given area/space has not reached maximum capacity, the display and/or one or more electronic devices will show the number of objects who may still enter the space before the maximum capacity is reached 18b. For example, the display may show that "2" objects are allowed to enter if the difference between the count and the predetermined threshold value is two. In some embodiments, the current number of objects permitted to enter the space and/or wait time will be sent to a sever, such as a cloud server, and the current number of objects permitted to enter the space and/or wait time will be transmitted the one or more electronic devices so that a user of the one or more electronic devices may view the data. In some embodiments, the timer may also be started when a first object enters the space, even if the maximum occupancy is not yet reached.

In some embodiments, if the one or more sensors detect an outflow (exiting), the number of persons in the given area will be decreased, and the count will be decreased. In some embodiments, when an outflow of one or more persons is detected, the one or more microcontrollers will determine if the previous count was equal to the predetermined threshold value 316. In some embodiments, the data may be sent to the server, where it may be transmitted to the one or more electronic devices to reflect the change. In some embodiments, the electronic screen may adjust to reflect the outflow and the number of persons that may enter a space before the maximum capacity is reached. In some embodiments, if the previous occupancy was equal to predetermined threshold value, and the outflow of one or more persons is detected, the timer will be stopped and the length of time at which maximum occupancy was met may be used to calculate the wait time for one person 17b. In some embodiments, if the previous count was not equal to predetermined threshold value, and the outflow of one or more persons is detected, the number of persons in the given will be decremented 17a.

In some embodiments, the one or more electronic devices may be started when an application is started 318. In some embodiments, the user of the one or more electronic devices may select a space with the device 319, such as a store, restaurant, bar, etc., that employs the hardware (the device). In some embodiments, the user may select whether the user is in line at the space selected through the one or more electronic devices. As used herein, the term "line" and "queue" are used synonymously. In some embodiments, the one or more electronic devices may determine whether the user of the one or more electronic devices is in a queue to enter the given space 320. By default, the application will assume that the user is not in a queue to enter the selected space 19b; however, the user may indicate to the one or more electronic devices, such as through an application, that the user is in the queue. Additionally, in some embodiments, the one or more microcontrollers may determine that a user is in queue at a given space by establishing a wireless communication between the one or more electronic devices and the one or more microcontrollers. In some embodiments, if the user is determined to be in a queue to enter the space at a given space, a number of total objects in the queue will be incremented 19b. In some embodiments, the total number of people in a queue may be useful in calculating a wait time, such as by taking into account the number of people in front of a user at a space and multiplying the number of people in front of a user and multiplying it by the time recorded by the timer, such as for representing the time between two entrances.

Figure 4:
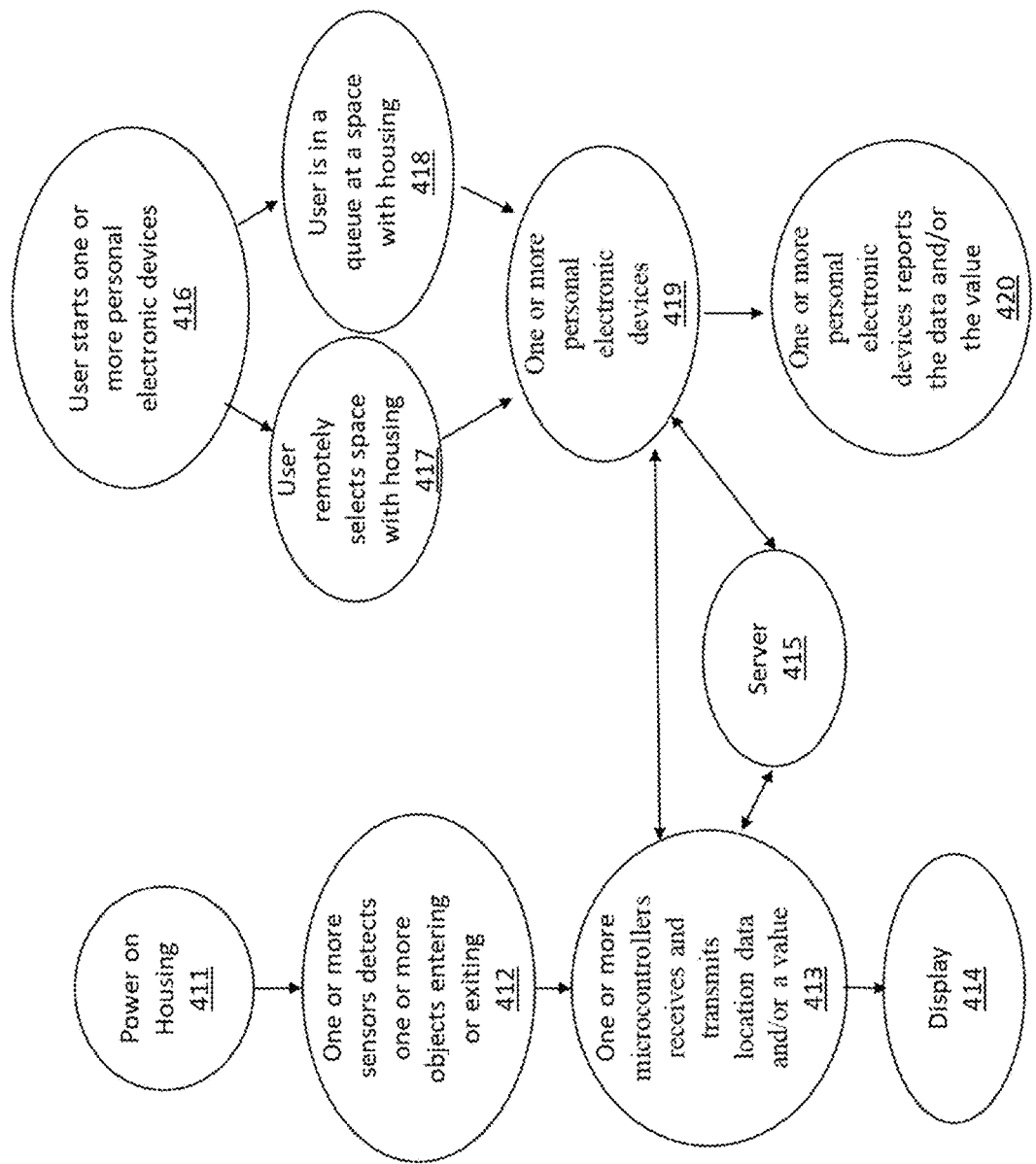
FIG. 4 shows a diagram of one embodiment of the process for displaying a value according to an embodiment disclosed herein.

In some embodiments, the one or more microcontrollers may be in wireless communication with the server 206 so that the one or more microcontrollers may transmit a value, such as the number of objects permitted to enter a space and/or a wait-time, to the server 206. In some embodiments, the server 206 may then transmit the value to one or more electronic devices when the user FIG. 4 demonstrates an illustrative process for displaying a value, such as a number of objects permitted to enter a space and/or a wait time, in accordance with embodiments described herein. In some embodiments, first, the housing must power on 411, which in turn activates the one or more sensors. In some embodiments, the one or more sensors detect one or more objects entering the space or exiting a space 412, generating location data for the one or more objects. In some embodiments, the one or more microcontrollers receive the location data from the one or more sensors and transmit the location data and/or the value, such as a calculated value representing a number of objects permitted to enter a space and/or a wait-time to enter the space. In some embodiments, the one or more microcontrollers may transmit the data and/or the value to one or more electronic devices, a server, and/or a display on the housing. In some embodiments, a user starts the one or more electronic devices 416, and may access the location data and/or the value through an application on the one or more electronic devices. In some embodiments, the user may remotely select a space with the housing 417 and/or the user is in queue at a space with the housing 418. In some embodiments, the one or more electronic devices receiving information from the user may be transmitted to the server 415, the one or more microcontrollers, and/or the one or more electronic devices. In some embodiments, the one or more electronic devices may then report the data and/or the value to the user 420.

The methods may comprise any of the components, processes, elements, capabilities, communications and the like, disclosed in this specification. In some embodiments, the methods comprise the use of the output interface disclosed herein. In some embodiments, the methods comprise the use of the housing, the server, and the one or more electronic devices. In some embodiments, the methods comprise the use of the housing, the server, the one or more electronic devices, and the output interface. In some embodiments, the methods comprise the use of the housing disclosed herein. In some embodiments, the methods comprise the use of the one or more sensors disclosed herein. In some embodiments, the methods comprise the use of the one or more microcontrollers disclosed herein. In some embodiments, the methods comprise the use of the display disclosed herein. In some embodiments the methods comprise the use of the server disclosed herein. In some embodiments, the methods comprise the use of one or more electronic devices disclosed herein. In some embodiments, the methods comprise the use of the application disclosed herein.

In some embodiments, the methods comprise a computer-implemented method. The computer-implemented method may be useful in displaying a value. The methods may comprise utilizing the housing described herein. In some embodiments, the method comprises detecting, by the one or more sensors, a signal corresponding with one or more object entering a space or exiting the space. In some embodiments, the detecting of the ultrasonic signal produces location data for the one or more objects. In some embodiments, the methods comprise receiving, by the one or more microcontrollers, location data from the one or more sensors.

A. Receiving a Signal from the One or More Sensors

Provided herein, in some embodiments, are methods comprising transmitting and/or receiving location data. The one or more sensors disclosed herein may be utilized in detecting one or more objects entering a space or exiting the space. In some embodiments, the method comprises receiving a signal by the one or more sensors. In some embodiments, the signal is an ultrasonic signal. In some embodiments, the signal corresponds with one or more objects. In some embodiments, the signal corresponds with one or more objects entering a space. In some embodiments, the signal corresponds with one or more objects exiting the space. In some embodiments, the signal corresponds with one or more objects entering a space or exiting the space. In some embodiments, the method comprises producing location data for the one or more objects from the signal. In some embodiments, the method comprises transmitting the location data to the one or more microcontrollers.

B. Receiving Location Data from the One or More Sensors

The location data produced by the one or more sensors in response to the detection of the one or more objects may be useful in calculations performed by the one or more microcontrollers. In some embodiments, the method comprises receiving, by the one or more microcontrollers, the location data from the one or more sensors. The location data may be useful in determining a number of one or more objects that have entered the space and a number of one or more objects that have exited the space.

C. Calculations Performed by One or More Microcontrollers

The one or more microcontrollers described herein may be utilized in calculating a value. The value may be any of the values disclosed herein. In some embodiments, the method comprises calculating the value based, at least in part, on the location data received from the one or more sensors. In some embodiments, the value is a real-time value. In some embodiments, the value is a predictive value.

1. Calculating a Wait Time

In some embodiments, the methods disclosed herein comprise the utilization of one or more microcontrollers for calculating a wait time. In some embodiments, the method comprises calculating a wait time by the one or more microcontrollers. In some embodiments, the wait time comprises an estimated wait time to enter a space. In some embodiments, the wait time comprises an average wait time. In some embodiments, the average wait time comprises the difference in time in which a first object of said one or more objects entering a space and a second object of said one or more objects exiting the space. In some embodiments, the average wait time comprises a time in which a first object of said one or more objects enters a space and a second object of said one or more objects enters the space. Calculation of the average wait time may account for multiple occurrences of one or more objects entering and/or exiting the space. Taking into account multiple occurrences of one or more objects entering and/or exiting the space may allow for an average wait time over a period of time to be calculated. In some embodiments, the method comprises calculating an average wait time by the one or more microcontrollers, by multiplying by the number of one or more electronic devices in communication with the one or more microcontrollers to generate a wait time. In some embodiments, the method comprises calculating, by the one or more microcontrollers, an average wait time for a first object of one or more objects to enter a space and a second object of one or more objects to exit the space. In some embodiments, the method comprises calculating, by the one or more microcontrollers, a wait time by multiplying the average wait time by a number of one or more electronic devices in wireless communication with the one or more microcontrollers.

In some embodiments, the number of one or more electronic devices in communication with one or more microcontrollers reflects the number of one or more electronic devices in a predefined area, such as an area outside of the space. The communication between the one or more microcontrollers and the one or more electronic devices may be any form of communication disclosed herein.

2. Calculating a Number of Objects that May Enter the Location

In some embodiments, the methods disclosed herein comprise the use of one or more microcontrollers for calculating a number of one or more objects permitted to enter a space before a threshold value is reached. In some embodiments, the methods comprise the one or more microcontrollers calculating a number of one or more objects permitted to enter a space. In some embodiments, the calculation for determining the number of one or more objects permitted to enter before a threshold value is reached comprises the one or more microcontrollers counting a number of said one or more objects in the space based on location data generated by the one or more sensors. In some embodiments, the calculation for determining the number of objects permitted to enter before a threshold value is reached comprises the one or more microcontrollers subtracting the number from the predetermined threshold value, such as a maximum occupancy.

3. Combination of Number of Objects and Wait Time

In some embodiments, the one or more microcontrollers are utilized in calculating a wait time to enter the space and a number of one or more objects permitted to enter the space. In some embodiments, the method comprises one or more microcontrollers calculating a wait time to enter the space and a number of one or more objects permitted to enter the space. In some embodiments, the first value comprises a wait time. In some embodiments, the second value comprises a number of one or more objects permitted to enter the space.

After the calculation has been executed, the one or more microcontrollers may transmit the value. In some embodiments, the method comprises the one or more microcontrollers transmitting the value to the display. In some embodiments, the method comprises the one or more microcontrollers transmitting the value to the server. In some embodiments, the method comprises the one or more microcontrollers transmitting the value to the one or more electronic devices. In some embodiments, the method comprises the one or more microcontrollers transmitting the value to an application on one or more electronic devices. In some embodiments, the methods comprise the one or more microcontrollers transmitting the one or more microcontrollers the value to the output interface.

In some embodiments, the method comprises displaying the value. In some embodiments, the method comprises the display displaying the value. In some embodiments, the method comprises the one or more electronic devices displaying the value. In some embodiments, the method comprises an application on the one or more electronic devices displaying the value. In some embodiments, the method comprises the output interface displaying the value.

In some embodiments, the method comprises the one or more microcontrollers receiving an input and/or value from one or more electronic devices. In some embodiments, the method comprises the one or more microcontrollers receiving an input and/or value from the output interface. In some embodiments, the method comprises the one or more microcontrollers receiving an input and/or value from the server.

D. Server Transmitting and Receiving

Disclosed herein, in some embodiments, are methods comprising the utilization of the server disclosed herein. In some embodiments, the server is in wireless communication with the one or more microcontrollers. In some embodiments, the method comprises the server receiving a value from the one or more microcontrollers. In some embodiments, the server is in wireless communication with the one or more electronic devices. In some embodiments, the method comprises the server receiving a value and/or input from the one or more electronic devices. In some embodiments, the server is in wireless communication with the output interface. In some embodiments, the method comprises the server receiving a value and/or input for the output interface. In some embodiments, the server transmits an input/value to the one or more microcontrollers.

In some embodiments, the method comprises the server transmitting the value to the one or more microcontrollers. In some embodiments, the method comprises the server transmitting the value to the one or more electronic devices. In some embodiments, the method comprises the server transmitting the value to the one or more output interface. In some embodiments, the method comprises the server transmitting the value to a local authority.

In some embodiments, the method comprises the server transmitting the value to the one or more electronic devices when a request the one or more electronic devices is received. The request may be generated in response to an input, which may be the selection of a location employing the housing. The selection of the location may prompt the one or more electronic devices to request the value from the server. Alternatively, the selection of the location may prompt a request for the value directly from the one or more microcontrollers.

E. Applications Using Systems and Devices

The systems and methods disclosed herein may be useful in numerous different applications. The applications of the systems and methods disclosed herein are exemplary and are not intended to limit the application of the device or methods in any manner.

In some embodiments, the methods and systems disclosed herein are used in calculating a number of people that are permitted enter a space, such as a store, restaurant, bar, or vehicle, before an occupancy limit is reached. In some embodiments, the methods and systems are used for generating a wait time for entering the space. For example, the systems and devices may be used on a form of public transit, such as a subway or bus, to help ensure that the form of public transit is not occupied over an occupancy limit.

In some embodiments, the systems and methods are employed at a parking garage or parking lot. Such use may help maintain a count of the number of vehicles that are permitted to enter the parking garage or parking lot before all of the parking space are occupied.

In some embodiments, the systems and methods are employed in a manufacturing facility. In some embodiments, the systems and methods are employed for use in packaging, shipping, and manufacturing. The systems and methods may be used to monitor the amount of goods that are on a conveyor belt, the amount of one or more goods that may fit into a package, or an amount of one or more goods that may be used to manufacture a second good. In some cases, the systems and methods may be useful in the pharmaceutical industry or in other manufacturing industries.

In some embodiments, the systems and methods are used in providing a wait time for vehicles in traffic. In some embodiments, the wait time is a wait time for a vehicle on a roadway. For example, the wait time may represent the average wait time for a vehicle located at a first point to reach a second point and the wait time may vary with traffic conditions. In some embodiments, the systems and methods are used in determining a speed of an object, such as a person or vehicle. In some embodiments, the systems and methods are used in providing a number of vehicles that may cross over a space, such as a bridge.

In some embodiments, the systems and methods are used in an amusement park. The systems and methods may be used for monitoring rides, such as roller coasters, and for displaying wait times. Amusement park rides often have occupancy limits to help ensure that there are adequate safety measures for the riders and to help ensure that the ride does not hold a load above a weight limit. Additionally, amusement park rides often have long wait times, and often, people contemplating whether to join a queue to ride the park ride may want to view a wait time beforehand.

In some embodiments, the systems and methods are used in a library. Often, during examination periods university libraries become crowded. Many universities have employed occupancy limits as an attempt to lower the amount of distractions in the library, such as noise.

In some embodiments, the systems and methods are used in a water park. The use of the systems and methods in the water parks may allow for occupancy limits within spaces within the water park to be accurately monitored. Often times, when water parks are crowded and are required to have occupancy limits so as to have an adequate number of lifeguards on duty.

III. NUMBERED EMBODIMENTS

In one aspect, disclosed herein are methods of employing a mobile application for viewing a value comprising: providing a mobile application on one or more electronic devices; transmitting a request in response to input to the mobile application to a server; transmitting a value from the server to the one or more electronic devices upon receipt of the request by the server; displaying the value on a graphic user interface on the one or more electronic devices; wherein the value is determined by the method comprising: (a) providing a housing comprising (i) one or more sensors comprising an ultrasonic sensor, (ii) one or more microcontrollers, and (iii) a display disposed on a surface of said housing; (b) receiving, by said one or more sensors, an ultrasonic signal corresponding with one or more objects entering a space or exiting said space to produce location data for said one or more objects; (c) receiving, by said one or more microcontrollers, said location data from said one or more sensors; (d) calculating, by said one or more microcontrollers, said value, based, on least in part, on said location data received from said one or more sensors in (c); and (e) displaying said value on said display.

In one aspect, disclosed herein are methods of transmitting a value, comprising: establishing a plurality of network communications wherein: a first network communication corresponds to a communication between one or more microcontrollers and a server; a second network communication corresponds to a communication between the server and one or more electronic devices, wherein each electronic device comprises a mobile application; formulating the value by; (a) one or more sensors comprising an ultrasonic sensor generating a signal corresponding to one or more objects entering a space or exiting said space to produce location data for said one or more objects; (b) receiving, by said one or more microcontrollers, said location data from said one or more sensors; (c) calculating, by said one or more microcontrollers, said value, based, on least in part, on said location data received from said one or more sensors in (b); (d) displaying said value on a display; and transmitting said value over the first network communication; generating a request from said mobile application in response to an input; transmitting said value in response to receiving said request by said server over the second network communication; and displaying said value on said mobile application.

In one aspect, disclosed herein is a system for viewing a value, comprising: a server; one or more electronic devices in wireless communication with said server; and a housing comprising: one or more sensors comprising an ultrasonic sensor configured to generate location data corresponding with one or more objects entering a space or exiting the space; one or more microcontrollers in wireless communication with said server, wherein said one or more microcontrollers is individually or collectively programed to implement a method comprising; (i) receiving said location data corresponding with said one or more objects entering said space or exiting said space; (ii) calculating a value based on said location data received in (i); and (iii) transmitting said value to said server, wherein said server is configured to transmit said value to one or more electronic devices; and a display operably coupled to said one or more microcontrollers and disposed on a surface of said housing, wherein said display is configured to display said value; and a mobile application on said one or more electronic devices for displaying said value.

In one aspect, disclosed herein are methods for displaying a value through a mobile application, comprising: providing the mobile application to one or more electronic devices; transmitting a request for a value from a server in response to an input from a user of the mobile application; receiving the value from the server; and displaying the value on the mobile application; wherein the generating the value comprises: providing a housing comprising: one or more sensors comprising an ultrasonic sensor configured to generate location data corresponding with one or more objects entering a space or exiting the space; one or more microcontrollers in wireless communication with said server, wherein said one or more microcontrollers is individually or collectively programed to implement a method comprising: (i) receiving said location data corresponding with one or more objects entering a space or exiting said space; (ii) calculating a value based on said location data received in (i); and (iii) transmitting said value to said server, wherein said server is configured to transmit said value to one or more electronic devices.

In some embodiments, wireless communication between said one or more electronic devices and said one or more microcontrollers occurs within a predefined area comprising an area outside of the space. In some embodiments, wireless communication between said one or more electronic devices and said one or more microcontrollers is a wireless communication comprising a maximum connectivity range of about 30 feet. In some embodiments, the value comprises an estimated wait time to enter said space. In some embodiments, the value comprises a maximum number of said one or more objects permitted to enter the space. In some embodiments, the one or more sensors comprises at least four of said ultrasonic sensor. In some embodiments, the output interface is displayed on a graphic user interface through a web portal and is in wireless communication with said one or more microcontrollers. In some embodiments, output interface is disposed on a surface of the housing.

In some embodiments, the wireless communication between the number of said one or more electronic devices and said one or more microcontrollers is a wireless communication comprising a maximum connectivity range of about 30 feet. In some embodiments, the method further comprises an output interface for receiving an input from a user; wherein said input comprises the value, a predetermined threshold value, or a combination thereof; and wherein said output interface transfers said input to said one or more microcontrollers. In some embodiments, the output interface is displayed on a graphic user interface through a web portal. In some embodiments, the output interface is disposed on a surface of said housing. In some embodiments, the housing is positioned above a portal of the space such that said one or more sensors are positioned to detect said one or more objects entering said space or exiting said space through said portal. In some embodiments, the one or more sensors comprises at least four of said ultrasonic sensor.

In some embodiments, the one or more electronic devices comprises a personal electronic device. In some embodiments, the personal electronic device comprises a mobile application for requesting said value. In some embodiments, the wireless communication between said number of said one or more electronic devices and said one or more microcontrollers occurs within a predefined area comprising an area outside of the space. In some embodiments, the wireless communication between said number of said one or more electronic devices and said one or more microcontrollers is a short-range wireless communication. In some embodiments, the housing further comprises an operator interface configured to input said value. In some embodiments, the one or more electronic devices comprises an operator interface. In some embodiments, the one or more sensors comprises at least four of said ultrasonic sensor. In some embodiments, the housing is positioned above a portal of the space such that said one or more sensors are positioned to detect said one or more objects entering said space or exiting said space through said portal. In some embodiments, the output interface is displayed on a graphic user interface through a web portal. In some embodiments, the output interface is disposed on a surface of said housing. In some embodiments, the one or more electronic devices comprise a personal electronic device.

IV. DEFINITIONS

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used in the specification and claims, the singular forms "a", "an" and "the" include plural references unless the context clearly dictates otherwise. For example, the term "a sample" includes a plurality of samples, including mixtures thereof.

As used herein, the term "about" a particular value refers to a range of 10% above the value to 10% below the value. For example, "about 100" refers to 90 to 110.

As used herein, the term "electronic device" can be any electronic device, including a personal electronic device. Non-limiting examples of personal electronic devices include cell phones, laptops, electronic tablets, and digital watches.

As used herein, the term "microcontroller" can be any integrated circuit configured to perform the methods disclosed herein.

As used herein, the term "object" can be any material thing that can be observed, and in some cases, touched. Non-limiting examples of objects according to the present disclosure include humans, animals, goods, vehicles, or cells. In some embodiments, the object may be solid, gaseous, or liquid, or a combination thereof.

As used herein, the term "pertinent information," can be any information that is relevant to an object entering or exiting a space. Non-limiting examples of pertinent information include a value (e.g., wait time, a number of objects permitted to enter the space, a number of objects in a predefined area), time of entry into a space, local or federal government guidelines or mandates (e.g., social distancing more than 6 feet between objects), or a predetermined threshold value.

As used herein, the term "predetermined threshold value," can be any value that is decided or calculated in advance. Non-limiting examples of predetermined threshold values include an occupancy limit, a maximum occupancy limit, or a occupancy limit put in place due to local or federal guidelines or mandates.

As used herein, the term "roadway" encompasses "avenue," "boulevard," "expressway," "throughway," "road," "highway," "street," "freeway," "turnpike," and any variation thereof.

As used here, the term "value," can be any value that is relevant to the occupancy of a space or a wait time to enter the space, such as those calculated by the systems or devices disclosed herein. Non-limiting examples of values include wait time, a number of objects permitted to enter the space, a number of objects in a predefined area, or an occupancy limit.

The section headings used herein are for organizational purposes only and are not to be construed as limiting the subject matter described.

V. EXAMPLES

The following examples are included for illustrative purposes only and are not intended to limit the scope of the disclosure.

Example 1

Monitoring a Number of People Permitted to Enter a Store

Using the housing disclosed herein, the number of people permitted to enter a store may be displayed on the housing located at the store, and on one or more electronic devices. An operator, such as an employee or owner of a space, will input a predetermined threshold representative of an occupancy limit into the input interface, for example twenty (20) if the operator desires the occupancy to be limited to 20 people. The input interface will transmit the predetermined threshold to the one or more microcontrollers. To calculate the values, the one or more microcontrollers will maintain a count. When a person enters the store through the store's doorway, the one or more sensors will detect a signal and increase a count by one. When the one or more sensors detects a subsequent signal of a person entering the store's doorway, the count will be further increased by one. Thus, at this point, the count will be two, with the count rising by one each time the one or more sensors detects a person entering the store. Therefore, when ten people enter, the count will be ten. When the one or more sensors detect a signal indicating that a person has exited the store through the count will be subtracted by one for each person detected as having exited the store. Therefore, when ten people have entered the store and two people have exited the store, the count will be eight. The count will be subtracted from the predetermined threshold (twenty) in order to calculate the number of people permitted to enter the store before the occupancy limit is reached. In this case, the number of people permitted to enter the store before the occupancy limit is reached will be twelve (12). The value of twelve will be transmitted from the one or more microcontrollers to the display on the housing and to a remote cloud server. The display on the housing will show that twelve people may enter the store before the occupancy limit is reached. A remote cellphone user may access the number of people that are permitted to enter the store through the use of a mobile application. Upon opening of the mobile application, the user, who is at a location remote from the store, may select the store. The selection of the store will generate a request from the cellphone which will be transmitted to the cloud server. In response to the request, the cloud server will transmit the number of people permitted to enter the store to the cell phone and the mobile application will display the value. In this case, when the user selects the store, the mobile application will display that twelve (12) people are permitted to enter the location before the occupancy limit is reached.

Example 2

Providing a Wait Time to Enter a Dining Area

A patron interested in entering a store employing the housing wishes to view the estimated wait time using a mobile application. The housing will be powered on, and the one or more microcontrollers will calculate a wait time when the restaurant is at an occupancy limit, such as a maximum occupancy. When the last person to enter the store before the occupancy limit is reached, the one or more microcontrollers will begin a timer. With an occupancy limit in place, the next person will enter the space only after a person leaves the space. The timer will continue until the next person enters the space within the occupancy limits, at which point the timer will stop. The timer will record a time of 2 minutes if the time between the last person to enter the store before the occupancy limit is reached and the next person to enter the space before the occupancy limit is exceeded is 2 minutes. The timer will record the time recorded. Multiple times are recorded in order to calculate an average wait time between two entrants. If the first time was 2 minutes, and the second time was 4 minutes, then the average time of the multiple average wait time would be 3 minutes. The average wait time between two entrants may be transmitted to a server, which is accessed by a user of an electronic device, such as a cellphone through the use of a mobile application.

The one or more microcontrollers will establish a wireless communication with one or more electronic devices in a predefined area comprising a queue for entering the location. The one or more microcontrollers will count the number of wireless communications between the one or more electronic devices in the predefined area and the one or more microcontrollers. When 10 people are in the queue to enter the location and the 10 people each comprise an electronic device that wirelessly communicates with the one or more microcontrollers, then the one or more microcontrollers will determine that 10 people are in the queue. The one or more microcontrollers will multiple the number of communications (10) by the average wait time (3 minutes) to generate an estimated wait time. Here, the estimated wait time will be 30 minutes for the $10^{th}$ person in the queue. The one or more microcontrollers will transmit the estimated wait time to the display and to the server. The one or more microcontrollers may adjust the calculation to transmit an altered estimated wait time to reflect the addition of another person in line at the queue. The estimated wait time will be viewable by a user of one or more electronic devices when the user selects the location employing the housing through a mobile application. The mobile application will request the estimated wait from the server, which then transmits the estimated wait time to the user's one or more electronic devices for viewing through the mobile application.

Example 3

Using the System to Determine a Wait Time in Traffic

A current or potential driver or an occupant of a vehicle is interested in determining the time in which it may take to drive from first point on a roadway to a second point on the roadway. A first group of sensors located at point A detects a signal from a first vehicle. A second group of sensors located at point B detects a second signal from the first vehicle. The one or more microcontrollers calculates the time between the detection of the first vehicle by the first group of sensors and the second group of sensors. Multiple times of multiple vehicles are gathered, and the one or more microcontrollers calculate an average time. The average time may be calculated over a given time period, such as over the course of one hour. For example, the average time may be calculated from 5 pm to 6 pm. The average time will be used in providing predicted wait times for similar time periods in the future. The average time is transmitted to and displayed by a housing comprising a display located at or near the roadway at point A. The average wait time is simultaneously transmitted to a server. The current or potential driver or occupant of a vehicle will access one or more electronic devices, such as their cell phone, open the web application, and select the roadway. The selection prompts the one or more electronic devices to request the average wait time from the server, and the server will send the average wait time to the one or more electronic devices for viewing through the web application.

Example 4

Displaying a Number of Parking Spaces Available in a Parking Garage

A potential or current driver or occupant of a vehicle is interested in parking a vehicle at a parking garage. A housing located at the parking garage will receive, from an input interface, a predetermined threshold that is the number of parking spaces in the parking garage. When a first vehicle enters the parking garage, the one or more sensors will detect an entry of the first vehicle into the parking garage, and the one or more microcontrollers will increase a count maintained by the one or more microcontrollers by one for entrance of the first vehicle. A second vehicle will exit the parking garage and the one or more microcontrollers will decrease the count by one for the exit of the second vehicle.

The parking garage has 100 available spaces will the predetermined threshold value of 100 is entered through the input interface. 20 vehicles enter the garage and the one or more microcontrollers increase the count by 20. 10 vehicles subsequently exit the garage and the one or more microcontrollers decrease the count by 10. Thus, the count is now 10. The count (10) is subtracted from the predetermined threshold (100) to show that 90 vehicles may enter the garage before garage is at maximum occupancy. The value of 90 will be transmitted to a display above the entrance of the parking garage for viewing. The value of 90 will be simultaneously transmitted to the server. A user of one or more electronic devices will open a mobile application on one or more electronic devices and select the parking garage on a map displaying the location of the parking garage by a distinct circle. The mobile application will generate a request for value, which is the number of objects that are permitted to enter the garage before all of the parking spaces are full. Upon receipt of the request, the server will transmit the value of 90 to the one or more electronic devices for the user to view through the mobile application.

Example 5

Selecting a Space of Interest from a Web Application

A user interested in entering a store accesses the web application on a laptop to obtain a value such as the number of people who may enter the space before an occupancy level is reached and the estimated wait time to enter the store. The user powers on laptop and selects the web application. The web application will open and display a main menu. The user selects or inputs the name of the store into a search bar in the web application. When the name of the location is entered into the search bar, a list of relevant search results is provided to the user. The user selects the name of the store from the list and the web application prompts the laptop to request the estimated wait time and the number of people permitted to enter the store from a cloud server. In response to the request, the cloud server transmits the estimated wait time and the number of people permitted to enter the store to the user's laptop, where the estimated wait time and the number of people permitted to enter the store will be displayed on the web application. The user will then return to the main menu where the user will select a second store for viewing of the second store's estimated wait time and the number of people permitted to enter the second store.

Example 6

Selecting Whether the User of a Mobile Application is in a Predefined Area

A third user having a cellphone is waiting in a the $3^{rd}$ position in a queue to enter a library. The third user's cellphone will communicate wirelessly with the one or more microcontrollers in the housing located at the library. The wireless communication between the cellphone and the one or more microcontrollers occurs when the user's cellphone is 30 feet away from the housing. The wireless communication is detected by the third user's cellphone and a mobile application on cellphone sends a notification to the user through the mobile application. The notification comprises two selection options. The first is to select that the third user is in the queue and the second is to select that the third user is not in the queue. The third user, through the mobile application, selects that the third user is in queue. When the third user selects that he or she is within the queue, the wireless communication between the one or more microcontrollers and the third user's device is counted by the one or more microcontrollers in determining the number of people in the queue. A second user and a third user each comprise a cellphone in communication with the one or more microcontrollers. The one or more microcontrollers determines, based on proximity of the cellphones to the one or more microcontrollers, that the third user is behind the second user, who is behind the first user. The one or more microcontrollers calculates an average wait time based off of the entrance and exit of earlier users and multiplies the average wait time by the position of the user in the queue.

The average wait time of previous users was three minutes. The third user selects the library on a mobile application, which requests the estimated wait time and the number of people that are permitted to enter the library. The one or more server calculates the estimated wait time for the third user by multiplying the average wait time (three minutes) by the position of the third user in the queue ($3^{rd}$ position) to produce a customized wait time of 9 minutes, which is delivered to the mobile application of the third user. Additionally, number of people permitted to enter the library will be delivered from the server to the third user's mobile application.

A fourth user comprising a fourth cellphone is inside the library. The one or more microcontrollers will send the notification to the fourth user's cellphone. The fourth user will select that he or she is not in the queue, and the one or more microcontrollers will not count the wireless communication between the one or more microcontrollers and the fourth user's cellphone in calculating an estimated wait time.

Example 7

Counting Items in Packaging

An owner or employee of a manufacturing facility desires to know the number of goods being placed for shipment and the time in which the packaging will be complete. Upon powering on a housing above a conveyor belt, goods on the conveyor belt passing under the one or more sensors will prompt the one or more sensors to generate location data, which is transmitted to the one or more microcontrollers. The one or more microcontrollers maintain a count of the number of goods that have passed by the one or more sensors and subtract the number from a predetermined threshold number to generate a value representative of the number of goods that are permitted to enter a box, before the predetermined threshold value is reached. The predetermined threshold number is a number of goods that are capable of fitting into the box. The one or more microcontrollers transmits the value to a display, and to a server. The server will deliver the value to one or more electronic devices when the server receives a request for the value from the one or more electronic devices. A person or machine responsible for monitoring the value observes the value from either the display or the one or more electronic devices to which the value has been transmitted. As the number of good permitted to enter the space reaches a predetermined number, the person or machine responsible for monitoring the value may ensures that a second box is readily available to store the one or more goods present after the predetermined threshold value has been reached. When the predetermined threshold is met, the box will be switched with a new box so that packaging may continue.

The one or more microcontrollers will monitor the wait time, which is the time it takes for the goods to enter the box. The wait time is used to monitor packaging and shipping productivity. The one or more microcontrollers will transmit the wait time to the display and the server. The person or machine responsible for monitoring the value may view the wait time on the display or on one or more electronic devices to which the value has been transmitted to from the server.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for displaying a value, said computer-implemented method comprising:
   (a) providing a housing comprising (i) one or more sensors comprising an ultrasonic sensor, (ii) one or more microcontrollers, and (iii) a display disposed on a surface of said housing;
   (b) receiving, by said one or more sensors, an ultrasonic signal corresponding with one or more objects entering a space or exiting said space to produce location data for said one or more objects;
   (c) receiving, by said one or more microcontrollers, said location data from said one or more sensors;
   (d) calculating, by said one or more microcontrollers, said value, based, at least in part, on said location data received from said one or more sensors in (c);
   (e) displaying said value on said display; and
   (f) transmitting, by said one or more microcontrollers, said value to a server that transmits said value to one or more electronic devices in wireless communication with said server and said one or more microcontrollers, wherein said value comprises an estimated wait time to enter said space, and wherein said calculating said value in (d) comprises:
   (i) calculating an average time for a first object of said one or more objects to enter said space and a second object of said one or more objects to exit said space; and
   (ii) multiplying said average time calculated in (i) by a number of said one or more electronic devices in wireless communication with said one or more microcontrollers.

2. The computer-implemented method of claim 1, wherein said one or more electronic devices comprise a personal electronic device comprising an application for requesting said value for said space.

3. The computer-implemented method of claim 1, wherein said wireless communication between said one or more electronic devices and said one or more microcontrollers has a maximum connectivity range of about 50 meters.

4. The method of claim 1, wherein said space comprises a library or an office building.

5. The method of claim 1, wherein said one or more microcontrollers comprise an edge device.

6. A computer-implemented method for displaying a value, said computer-implemented method comprising:
   (a) providing a housing comprising (i) one or more sensors comprising an ultrasonic sensor, (ii) one or more microcontrollers, and (iii) a display disposed on a surface of said housing;
   (b) receiving, by said one or more sensors, an ultrasonic signal corresponding with one or more objects entering a space or exiting said space to produce location data for said one or more objects;
   (c) receiving, by said one or more microcontrollers, said location data from said one or more sensors;
   (d) calculating, by said one or more microcontrollers, said value, based, at least in part, on said location data received from said one or more sensors in (c);
   (e) displaying said value on said display; and (f) transmitting, by said one or more microcontrollers, said value to a server that transmits said value to one or more electronic devices in wireless communication with said server,
wherein said value comprises a number of said one or more objects permitted to enter said space, and wherein said calculating said value in (d) comprises:
(i) counting a number of said one or more objects in said space based on the location data received in (c); and
(ii) subtracting the number calculated in (i) from a predetermined threshold value, wherein said predetermined threshold value is a maximum occupancy for the space.

7. The method of claim 6, wherein said one or more electronic devices comprise a personal electronic device comprising an application for requesting said value for said space.

8. The computer-implemented method of claim 6, further comprising a wireless communication between said one or more electronic devices and said one or more microcontrollers, wherein said wireless communication between said one or more electronic devices and said one or more microcontrollers has a maximum connectivity range of about 50 meters.

9. The method of claim 6, wherein said space comprises a library or an office building.

10. The method of claim 6, wherein said predetermined threshold value is entered remotely.

11. A computer-implemented method for displaying a value, said computer-implemented method comprising:
(a) providing a housing comprising (i) one or more sensors comprising an ultrasonic sensor, (ii) one or more microcontrollers, and (iii) a display disposed on a surface of said housing;
(b) receiving, by said one or more sensors, an ultrasonic signal corresponding with one or more objects entering a space or exiting said space to produce location data for said one or more objects;
(c) receiving, by said one or more microcontrollers, said location data from said one or more sensors;
(d) calculating, by said one or more microcontrollers, said value, based, at least in part, on said location data received from said one or more sensors in (c);
(e) displaying said value on said display; and
(f) transmitting, by said one or more microcontrollers, said value to a server that transmits said value to one or more electronic devices in wireless communication with said server,
wherein calculating said value in (d) comprises calculating two values comprising a first value and second value, and wherein calculating a first value of said two values comprises:
(i) calculating an average time for a first object of said one or more objects to enter said space and a second object of said one or more objects to exit said space; and
(ii) multiplying said average time calculated in (i) by a number of said one or more electronic devices in wireless communication with said one or more microcontrollers;
and wherein said first value comprises an estimated wait time to enter said space.

12. The computer-implemented method of claim 11, wherein calculating a second value of said two values comprises:
(i) counting a number of said one or more objects in said space based on said location data received in (c); and
(ii) subtracting said number calculated in (i) from a predetermined threshold value, wherein said predetermined threshold value is a maximum occupancy for said space; and
wherein said second value comprises a number of objects permitted to enter said space.

13. The computer-implemented method of claim 11, wherein said one or more electronic devices comprise a personal electronic device comprising an application for requesting said value for said space.

14. The computer-implemented method of claim 11, wherein said wireless communication between said one or more electronic devices and said one or more microcontrollers has a maximum connectivity range of about 50 meters.

15. The method of claim 11, wherein said space comprises a library or an office building.

16. The method of claim 11, further comprising displaying said second value on said display.

17. A method for displaying a value, said method comprising:
(a) providing a housing comprising:
(i) one or more sensors comprising an ultrasonic sensor for detecting an ultrasonic signal corresponding with one or more objects entering a space or exiting said space, thereby producing location data for said one or more objects;
(ii) one or more microcontrollers that (1) receives said location data from said ultrasonic sensor, and (2) calculates said value, based, at least in part, on said location data received in (1) from said ultrasonic sensor; and
(iii) a display disposed on a surface of said housing that displays said value; and
(b) transmitting, by said one or more microcontrollers, said value to a server, wherein said server transmits said value to one or more electronic devices in wireless communication with said server and said one or more microcontrollers,
wherein said value is calculated in (2) by a method comprising:
calculating an average time for a first object of said one or more objects to enter said space and a second object of said one or more objects to exit said space; and
multiplying said average time calculated in (a) by a number of said one or more electronic devices that is in wireless communication with said one or more microcontrollers, wherein said value comprises an estimated wait time to enter said space.

18. The method of claim 17, wherein said wireless communication between said one or more electronic devices and said one or more microcontrollers has a maximum connectivity range of about 50 meters.

19. The method of claim 17, wherein said one or more electronic devices comprise a personal electronic device comprising an application for requesting said value for said space.

20. The method of claim 17, wherein said space comprises a library or an office building.

21. The method of claim 17, further comprising displaying said value on said one or more electronic devices.

22. A method for displaying a value, said method comprising:
(a) providing a housing comprising:
(i) one or more sensors comprising an ultrasonic sensor for detecting an ultrasonic signal corresponding with one or more objects entering a space or exiting said space, thereby producing location data for said one or more objects;
(ii) one or more microcontrollers that (1) receives said location data from said ultrasonic sensor, and (2) calculates said value, based, at least in part, on said location data received in (1) from said ultrasonic sensor; and
(iii) a display disposed on a surface of said housing that displays said value; and
(b) transmitting, by said one or more microcontrollers, said value to a server, wherein said server transmits said value to one or more electronic devices in wireless communication with said server
wherein said value is calculated in (2) by a method comprising:
counting a number of said one or more objects in said space based on said location data received in (ii)(1); and
subtracting said number of said one or more objects in said space from a predetermined threshold value, wherein said predetermined threshold value is a maximum occupancy for said space, and wherein said value comprises a number of said one or more objects permitted to enter said space.

23. The method of claim 22, further comprising a wireless communication between said one or more electronic devices and said one or more microcontrollers, wherein said wireless communication between said one or more electronic devices and said one or more microcontrollers has a maximum connectivity range of about 50 meters.

24. The method of claim 22, wherein said one or more electronic devices comprise a personal electronic device comprising an application for requesting said value for said space.

25. The method of claim 22, wherein said space comprises a library or an office building.

26. The method of claim 22, wherein said housing is positioned above a portal of said space.

27. A method for displaying a value, said method comprising:
(a) providing a housing comprising:
(i) one or more sensors comprising an ultrasonic sensor for detecting an ultrasonic signal corresponding with one or more objects entering a space or exiting said space, thereby producing location data for said one or more objects;
(ii) one or more microcontrollers that (1) receives said location data from said ultrasonic sensor, and (2) calculates said value, based, at least in part, on said location data received in (1) from said ultrasonic sensor;
(iii) a display disposed on a surface of said housing that displays said value; and
(b) transmitting, by said one or more microcontrollers, said value to a server, wherein said server transmits said value to one or more electronic devices in wireless communication with said server, and
transmitting an input to said one or more microcontrollers by an output interface configured for receiving said input from a user, wherein said input comprises said value, a predetermined threshold value, or a combination thereof.

28. The method of claim 27, further comprising a wireless communication between said one or more electronic devices and said one or more microcontrollers, wherein said wireless communication between said one or more electronic devices and said one or more microcontrollers has a maximum connectivity range of about 50 meters.

29. The method of claim 27, wherein said one or more electronic devices comprise a personal electronic device comprising an application for requesting said value for said space.

30. The method of claim 27, wherein said space comprises a library or an office building.

* * * * *